(12) United States Patent
Groeneveld et al.

(10) Patent No.: US 9,727,639 B2
(45) Date of Patent: *Aug. 8, 2017

(54) NAME SEARCH USING A RANKING FUNCTION

(71) Applicant: MICROSOFT TECHNOLOGY LICENSING, LLC, Redmond, WA (US)

(72) Inventors: Dirk H. Groeneveld, Bellevue, WA (US); Dmitriy Meyerzon, Bellevue, WA (US); David Mowatt, Seattle, WA (US); Jessica A. Alspaugh, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 118 days.

This patent is subject to a terminal disclaimer.

(21) Appl. No.: 14/171,155

(22) Filed: Feb. 3, 2014

(65) Prior Publication Data

US 2014/0222792 A1  Aug. 7, 2014

Related U.S. Application Data

(63) Continuation of application No. 12/141,082, filed on Jun. 18, 2008, now Pat. No. 8,645,417.

(51) Int. Cl.
 *G06F 17/30* (2006.01)

(52) U.S. Cl.
 CPC .. *G06F 17/30657* (2013.01); *G06F 17/30864* (2013.01)

(58) Field of Classification Search
 CPC ................. G06F 17/3053; G06F 17/30657
 (Continued)

(56) References Cited

U.S. PATENT DOCUMENTS

| 5,600,835 A | 2/1997 | Garland et al. |
| 6,018,735 A | 1/2000 | Hunter |

(Continued)

OTHER PUBLICATIONS

"Microsoft Cambridge at TREC-14: Enterprise Track", by: Nick Craswell, Published 2005 http://research.microsoft.com/pubs/65241/craswell_trec05.pdf.*

(Continued)

*Primary Examiner* — Chelcie Daye

(57) ABSTRACT

An approach is described for performing a name search using a name search operation and a ranking operation. The name search operation may take text as input and apply a fuzzy matching operation and a lookup operation to generate a collection of candidate names with respective probability scores. In other cases, speech or handwriting recognition may generate the collection of candidate names and probability scores. The ranking operation may then rank these candidate names using a ranking function. The ranking function may rank the candidate names based on the probability scores associated with the names and at least one other factor. One such factor may reflect whether information provided by a user matches profile information associated with a candidate name under consideration. Another factor may reflect an extent of a nexus between the user and a person associated with the candidate name. Other types of factors can be used.

20 Claims, 16 Drawing Sheets

(58) Field of Classification Search
USPC .................................................. 707/776, 758
See application file for complete search history.

(56) References Cited

U.S. PATENT DOCUMENTS

| | | | | |
|---|---|---|---|---|
| 6,697,799 | B1* | 2/2004 | Neal | G06F 17/30864 706/12 |
| 6,748,387 | B2 | 6/2004 | Garber et al. | |
| 6,751,605 | B2* | 6/2004 | Gunji | G06K 9/72 707/1 |
| 7,212,967 | B2 | 5/2007 | Wen et al. | |
| 7,512,666 | B2* | 3/2009 | Zhou | G06F 17/30867 707/999.003 |
| 2004/0024760 | A1 | 2/2004 | Toner et al. | |
| 2005/0084152 | A1* | 4/2005 | McPeake | G06F 17/30985 382/173 |
| 2005/0262050 | A1* | 11/2005 | Fagin | G06F 17/30864 707/3 |
| 2005/0283473 | A1 | 12/2005 | Rousso et al. | |
| 2006/0089927 | A1 | 4/2006 | Bandyopadhyay et al. | |
| 2006/0206477 | A1 | 9/2006 | Dalvi et al. | |
| 2007/0005567 | A1* | 1/2007 | Hermansen | G06F 17/30634 707/3 |
| 2007/0260595 | A1 | 11/2007 | Beatty et al. | |
| 2008/0228720 | A1* | 9/2008 | Mukherjee | G06F 17/30672 707/3 |
| 2008/0275865 | A1* | 11/2008 | Kretz | G06F 17/30867 707/5 |

OTHER PUBLICATIONS

"Microsoft Cambridge at TREC-14: Enterprise track"; by: Nick Craswell; Published 2005 https://www.microsoft.com/en-us/research/wp-content/uploads/2016/02/craswell_trec05.pdf.*

Craswell et al., "Microsoft Cambridge at TREC-14: Enterprise Track," Proceedings of the Fourteenth Text Retrieval Conference (TREC 2005), 2005, 4 pages.

Holmes et al., "Improving Precision and Recall for Soundex Retrieval," Proceedings of the International Conference on Information Technology: Coding and Computing, published by IEEE Computer Society, Washington, DC, USA, 2002, 5 pages.

Pouliquen et al., "Multilingual person name recognition and transliteration," Journal COREAL—Cognition, Representation, Language, 2005, 24 pages.

Zobel et al., "Phonetic String Matching: Lessons from Information Retrieval," Proceedings of the 19th Annual International ACM SIGIR Conference on Research and Development in Information Retrieval, published by ACM, New York, NY, USA, 1996, 6 pages.

* cited by examiner

NAME SEARCH USING A RANKING FUNCTION

CROSS-REFERENCE TO RELATED APPLICATIONS

This application is a continuation of, claims the benefit of and priority to, previously filed U.S. patent application Ser. No. 12/141,082 entitled "Name Search Using a Ranking Function" filed on Jun. 18, 2008, the subject matter of which is hereby incorporated by reference in its entirety.

BACKGROUND

A name lookup engine allows a user to retrieve information regarding a person by typing in that person's name. However, this type of engine is not always successful in locating the desired information. In one case, for instance, a user may have forgotten how to spell the person's name. Or the user may have never seen the person's name written out or in print. As a result, the user may type in the incorrect spelling of the person's name, possibly preventing the lookup engine from locating the desired information.

In another case, the name lookup engine may respond to a name query by returning a list of names. An entry in this list may in fact correspond to the person that the user is looking for. However, the user may have difficulty quickly identifying the desired entry in the list. This may be particularly true for some queries. For example, a user who enters "John Smith" into a lookup engine may have difficulty making use of a long list which includes, for example, multiple "J. Smith" entries.

More generally, name lookup engines may sometimes have difficulty determining the actual search objectives of a user on the basis of an input name, whether spelled correctly or incorrectly. Similar shortcomings may be present in other types of lookup engines.

SUMMARY

An illustrative approach is described herein for performing a name search. In one illustrative implementation, the approach makes use of a name search module and a ranking module. The name search module operates by receiving input information from a user that includes an input name, and, optionally, supplemental information. In response, the name search module provides a plurality of candidate names having probability scores associated therewith. Each probability score reflects a degree of confidence that a corresponding candidate name is an appropriate match for the input name. The probability scores define respective name search factor values, according to the terminology used herein.

In one illustrative implementation, the ranking module operates by generating a plurality of rank values associated with the candidate names using a ranking function. In one example, for each candidate name, a rank value is based on an associated name search factor value and at least one other type of factor value. The ranking module ranks the candidate names based on their corresponding rank values.

According to one illustrative feature, the above-mentioned other factor value is a query-based factor value, according to the terminology used herein. This factor value is based on a determination of whether information (that was input by the user, such as the supplemental information) matches profile information associated with a candidate name under consideration. For example, the supplemental information entered by the user may specify expertise information, team information, group affiliation information, and so on. For example, if the user types the query term "accountant" along with an input name, an appropriate query-based factor value can be generated which identifies whether a candidate name under consideration corresponds to a person who is an accountant (which, in turn, can be gleaned from profile information).

According to another illustrative feature, the above-mentioned other factor value is a nexus factor value, according to the terminology used herein. This factor value is based on a determination of some type of similarity between the user who enters the input information and a person associated with a candidate name under consideration (which can be gleaned from the profile information associated with the user and the profile information associated with the candidate name). For example, the nexus factor value may be based on a determination of whether the user and the person associated with the candidate name have a same job title. In another example, the query-based factor value may be based a social distance between the user and the person associated with the candidate name. The social distance identifies how "close" the user is to the other person within a web of relationships. In one case, for instance, the social distance can identify whether the user has a direct relationship with the other person. In another case, the social distance identifies whether the user has an indirect relationship with the person (and if so, the degree of such an indirect relationship). As will be discussed, other types of distance factor values can be generated for use by the ranking module.

According to another illustrative feature, the above-mentioned other factor value is a static factor value, according to the terminology used herein. This factor value is based on any kind of evaluation of a candidate name under consideration that is independent of: a) the identity of the user making the query; and b) any supplemental information entered by the user.

In an alternative illustrative implementation, the ranking function can generate a rank value that is independent of a name search factor value. In this case, the rank value can be based on one or more query-dependent factor values and/or one or more nexus factor values and/or other one or more static factor values and/or one or more other types of factor values.

According to another illustrative feature, the name search module can generate the plurality of candidate names by generating different versions of the input name and performing a fuzzy matching operation and a lookup operation based on one or more of the different versions to generate one or more candidate names. For example, the name search module can generate a pronunciation version of the input name and then perform a fuzzy matching operation and a lookup operation based on the pronunciation version of the input name.

According to one illustrative implementation, the query module provides a robust tool for finding information regarding a desired person or other entity. For instance, the query module may provide results which are relatively intolerant to the way in which the user specifies an input name. Further, by virtue of the use of a multi-factor ranking function, the query module may provide results which more sharply focus on the true target of the user's search.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

A name lookup engine allows a user to retrieve information regarding a person by typing in that person's name. However, this disclosure sets forth an approach for performing a search based on an input name and/or other information. The approach may provide results which are relatively intolerant to the way in which the user specifies an input name. Further, by virtue of the use of a multi-factor ranking function, the approach may provide results which more sharply focus on the target of the user's search. More generally, the concepts disclosed herein may address one or more of the challenges or problems previously noted, but are not limited to addressing all or any of these challenges or problems.

In the ensuing description, the term "names" encompasses the names of people. However, the term "names" should be construed liberally herein to also refer to labels associated with other kinds of entities.

This disclosure is organized as follows. Section A presents an overview of functionality used for creating an index of names and then using that index to search for a desired name. Section B provides additional details regarding indexing functionality used for creating the index of names. Section C provides additional details regarding one kind of illustrative searching functionality used for searching the index for a desired name. Section D provides additional details regarding a fuzzy matching operation that may be used by the searching functionality described in Section C. Section E provides additional details regarding a ranking operation that may be used by the searching functionality described in Section C or some other context. Section F describes illustrative processing functionality that can be used to implement any aspect of the features described in the foregoing sections.

Figure 22:
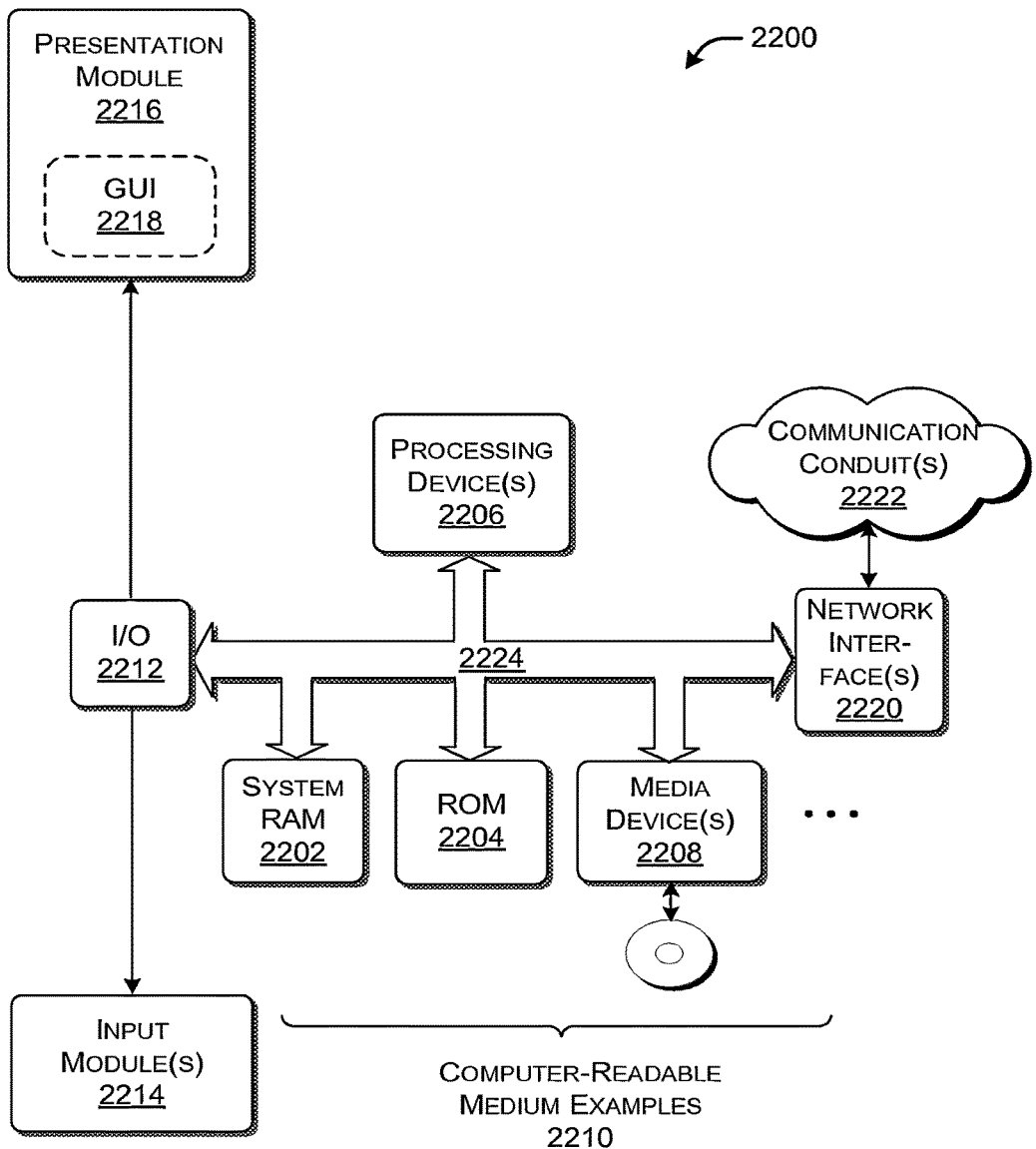
FIG. 22 shows illustrative processing functionality that can be used to implement any aspect of the features shown in the foregoing drawings.

As a preliminary matter, some of the figures describe the concepts in the context of one or more components, variously referred to as functionality, modules, features, elements, etc. The various components shown in the figures can be implemented in any manner, for example, by software, hardware, firmware, manual processing operations, and so on, or any combination of these implementations. In one case, the illustrated separation of various components in the figures into distinct units may reflect the use of corresponding distinct physical components. Alternatively, or in addition, any single component illustrated in the figures may be implemented by plural physical components. Alternatively, or in addition, the depiction of any two or more separate components in the figures may reflect different functions performed by a single physical component. FIG. 22, to be discussed in turn, provides additional details regarding one illustrative implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken into plural component blocks, and certain blocks can be performed in an order that differs from the order employed in the examples set forth in this disclosure. The blocks shown in the flowcharts can be implemented by software, firmware, hardware, manual processing, any combination of these implementations, and so on.

A. Overview (FIG. 1)

Figure 1:
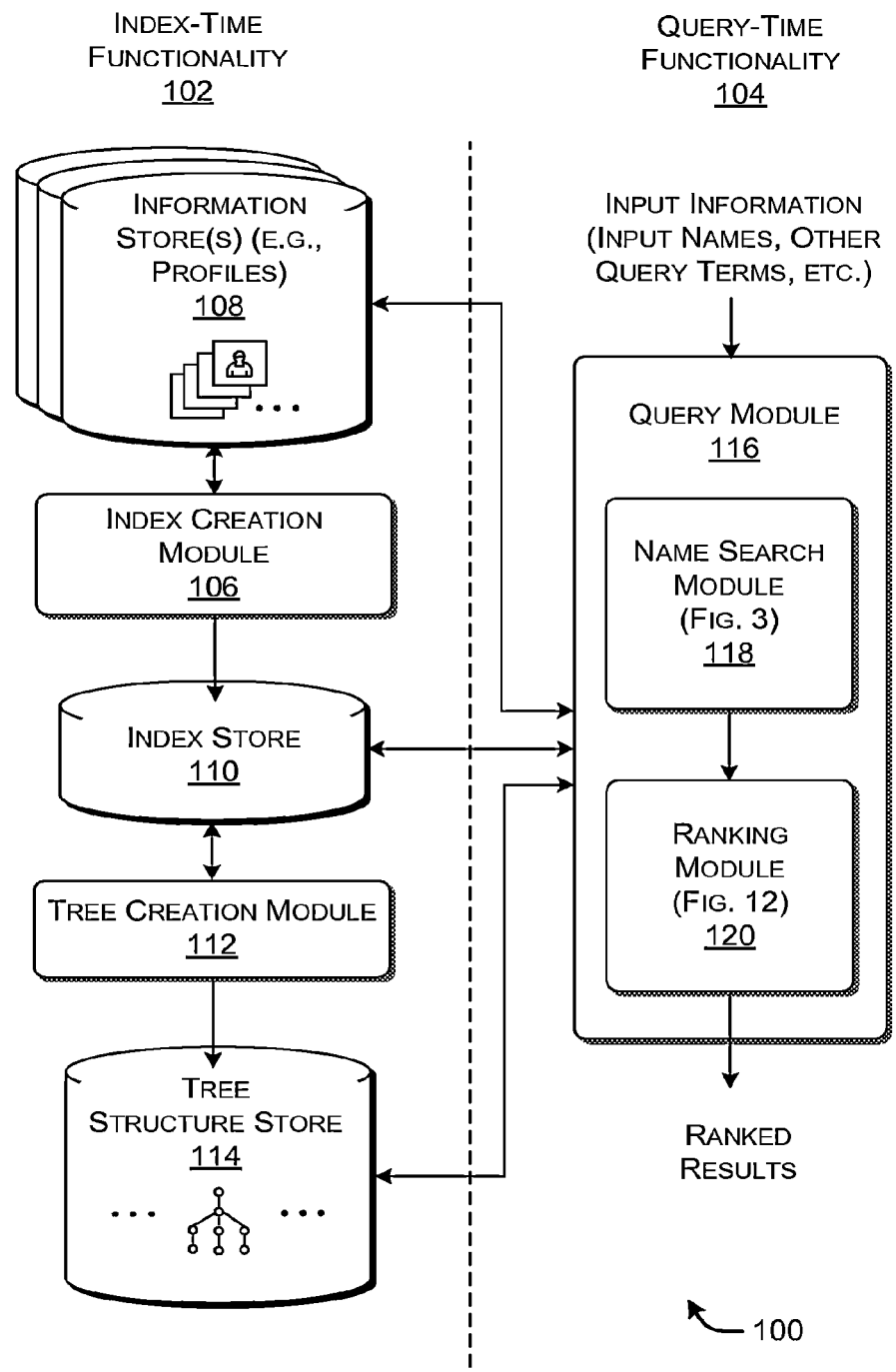
FIG. 1 shows an overview of an illustrative name search system for creating an index of names and then using that index to perform a name search.

FIG. 1 shows an overview of an illustrative name search system 100. The name search system 100 includes two functional pieces: index-time functionality 102 and query-time functionality 104. The index-time functionality 102 is used to create an index of names and other information. The index-time functionality 102 also creates one or more tree structures (such as Trie structures) for use in a fuzzy matching operation (to be described below). The query-time functionality 104 is used to provide information regarding a desired person corresponding to an input name provided by a user. To perform this task, the query-time functionality 104 attempts to match the input name to a corresponding name in the index. The following explanation provides additional introductory information regarding the index-time functionality 102 and the query-time functionality 104.

The index-time functionality 102 includes an index creation module 106. The index creation module 106 builds a searchable index based on source information provided in one or more source information stores 108 (referred to in the singular below for brevity as a source store 108). The indexing operation will be described in greater detail below with respect to FIG. 2. The index creation module 106 stores the index that it creates in an index store 110.

The index-time functionality 102 also includes a tree creation module 112. The tree creation module 112 builds a hierarchical tree-like data structure (referred to as simply as a "tree structure" below) based on names provided in the index. One illustrative type of tree structure is a Trie structure. The query-time functionality 104 uses the tree structure in performing a fuzzy matching operation. Both the fuzzy matching operation and the tree structure itself will be explained in greater detail in the context of the discussion of FIGS. 7-11. The tree creation module 112 stores the created tree structure in a tree store 114.

The query-time functionality 104 uses a query module 116 for performing name searches. In operation, a user may use the query module 116 to retrieve information regarding a desired person. To perform this task, the user provides input information to the query module 116. The input information may include one or more parts. One part of the input information may optionally specify an input name corresponding to the name of the desired person. The query module 116 operates by attempting to match the input name with names provided in the index. The query module 116 can convey the outcome of its analysis as a ranked list of candidate names for the user's consideration. If the user deems that one of these candidate names corresponds to the person he is looking for, he may obtain additional information regarding this person.

The query module 116 may include a name search module 118 and a ranking module 120. The name search module 118 identifies an initial list of matching candidate names based on name-related considerations alone. That is, the name search module 118 provides the initial list of candidate names based on the assessed "closeness" of these candidate names to the input name, as well as, optionally, one or more other considerations. To generate these results, the name search module 118 can perform a fuzzy matching operation using the tree structure provided in the tree store 114. Based on the results of the fuzzy matching operation, the name search module 118 can perform a lookup operation using the index provided in the index store 110. Additional details regarding the name search operation as a whole are provided in the context of the discussion of FIGS. 3-6. Additional details regarding the fuzzy matching operation itself are provided in the context of the discussion of FIGS. 7-11.

The ranking module 120 generates a ranked list of candidate names based on the results of the name search module 118 and additional potential considerations. That is, for each candidate name identified in the name search module 118, the ranking module 120 generates a rank value (using a ranking function) that is a function of one or more factors. The ranking module 120 ranks the candidate names on the basis of the rank values determined for the respective candidate names.

One factor that may be used by the ranking function is referred to herein as a "name search factor." The value of this factor is based on the output of the name search module 118. For example, for a particular candidate name under consideration, the name search factor value may quantify an assessed appropriateness of a match between the input name and the candidate name. In one illustrative and non-limiting case, the name search factor value may correspond to a probability score assigned to the candidate name by the name search module 118.

Another factor that may be used by the ranking function is referred to herein as a "query-based factor." The value of this factor is based on a determination of whether information input by the user (e.g., in addition to the input name) matches corresponding information associated with the candidate name. For example, in addition to an input name (e.g., "Joe Brown"), assume that user enters the query term "test engineer." The ranking module 120 can generate a query-based factor value which indicates whether the person associated with a candidate name under consideration is also a test engineer (as may be gleaned from this person's profile information).

Another factor that may be used by the ranking function is referred to herein as a "nexus factor." This value of this factor is based on a determination of an assessed relationship between the user making the search and the person associated with the candidate name. For example, the person making the search may be a test engineer. Without requiring the user to enter this information as a query term, the ranking module 120 can determine a nexus factor value that reflects the fact that both the user and the person associated with the candidate name ("Joe Brown" again) are test engineers (which, again, can be gleaned from profile information associated with the user and the candidate name under consideration). Another nexus factor is based on a "social distance" between the person making the search and the person associated with the candidate name (to be described below). The social distance identifies how "close" the user is to the other person within a web of relationships. In one case, for instance, the social distance can identify whether the user has a direct relationship with the other person. In another case, the social distance identifies whether the user has an indirect relationship with the person (and if so, the degree of such indirect relationship).

Another factor that may be used by the ranking function is referred to herein as a "static factor." This value of a static factor is based on or more considerations that are independent of both the nature of a user's query and the identity of the user herself. In one case, a static factor value can be based on some attribute (or plural attributes) found (or not found) in a candidate name's profile information. For example, the ranking module 120 can assign a first static rank value to a candidate name if that person's profile information indicates that she is an intern, and a second static rank value to a candidate name if that person's profile information indicates that she is a full-time employee (thus potentially biasing the ranking of candidate names in favor of full-time employees over interns, or vice versa).

Other query-based factors, nexus factors, and static factors will be described in Section E below.

Once again, the final rank value for the candidate name is based on the output of the ranking function. The ranking function, in turn, may generate the rank value based on any type of factors or any combination of different types of factors. The ranking function can include one of more name search factors (but can also omit name search factors). In addition, or alternatively, the ranking function can include one or more query-based factors (but can also omit query-based factors). In addition, or alternatively, the ranking function can include one or more nexus factors (but can also omit nexus factors). In addition, or alternatively, the ranking function can include one or more static factors (but can also omit static factors), and so on. In addition, or alternatively, the ranking function can also include any other types of factors. The top-ranked entry in the list of candidate names has the highest probability, as assessed by the query module 116, of matching the person that user is looking for.

In one illustrative case, the name search module 118 identifies candidate names which are associated with profile documents. For example, assume that the name search module 118 identifies the candidate name "Frank Jones." This candidate name may be associated with a specific profile document that provides information regarding the individual Frank Jones. (It is also possible that a single candidate name is associated with multiple profile documents that include the candidate name). In this implementation, the ranking module 120 can rank the profile documents based on the illustrative considerations identified above. To facilitate discussion, however, the operation of the ranking module 120 is described in general terms as ranking candidate names; it should be understood that, in one implementation, this general operation can be performed by ranking profile documents (or other types of documents) that are associated with the candidate names.

Additional details regarding the ranking operation are provided in the context of the discussion of FIGS. 12-19. It should be noted that the ranking module 120 is optional. That is, in one implementation, the query module 116 can output a collection of candidate names based solely on name-based considerations, e.g., without taking into account query-based factors, nexus factors, static factors or other types of factors. In this scenario, the query module 116 can order the candidate names based on probability scores associated with the candidate names (to be discussed). Alternatively, the query module 116 can generate a collection of candidate names that satisfy a similarity-based threshold; the query module 116 can then place the collection of candidate names in alphabetical order or in some other type of order. Alternatively, the query module 116 can output an unordered list of candidate names.

Figure 3:
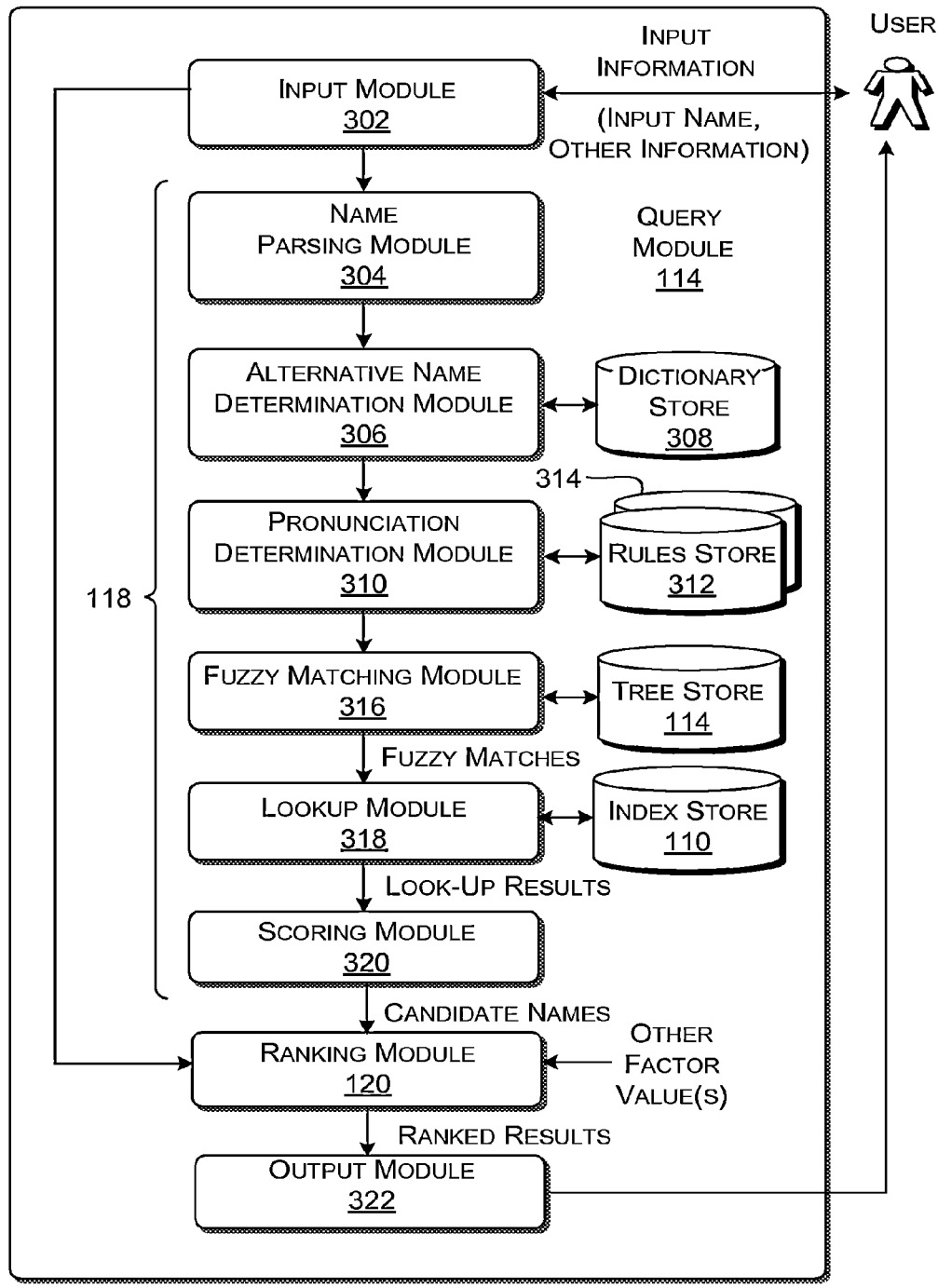
FIG. 3 shows an illustrative query module for use in the system of FIG. 1; the query module performs a name search based on an input name.

Further, this description will explain a particular type of name search module 118 with reference to FIG. 3. However, as will be clarified in Section E, the ranking module 120 (when it is used) can be used in conjunction with other types of name search modules. In yet another implementation, the name search module 120 can be entirely omitted. In this case, the user can input any combination of query terms which describe a desired person; the query module 116 processes these query terms without the similarity-based assistance provided by the name search module 118.

B. Indexing Functionality (FIG. 2)

Figure 2:
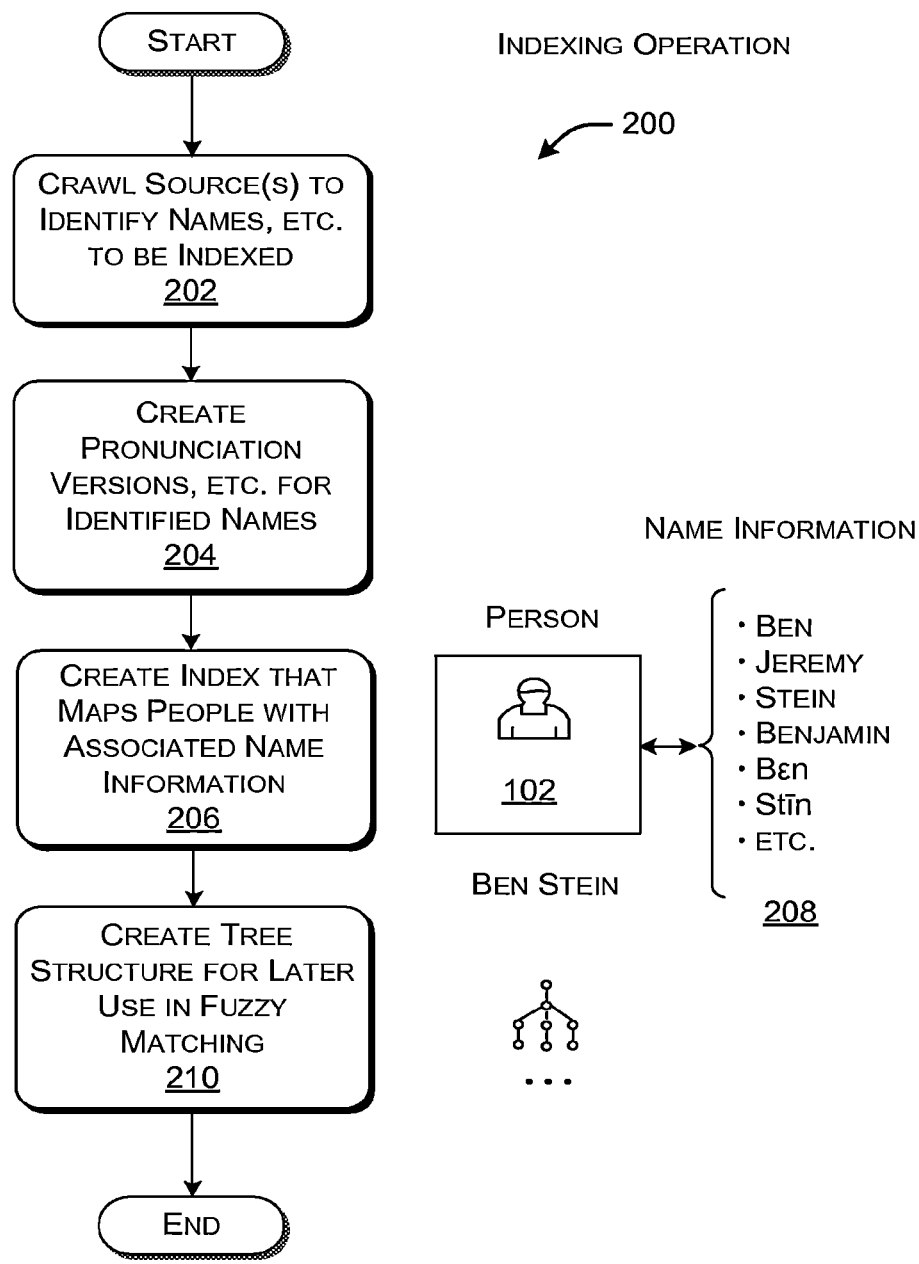
FIG. 2 shows an illustrative procedure for creating an index of names and also for creating one or more tree structures (such as Trie structures) for use in performing fuzzy matching.

FIG. 2 shows an illustrative procedure 200 that explains one manner of operation of the index-time functionality 102 of FIG. 1. By way of overview, the procedure 200 creates a searchable index of name information for later use by a lookup operation performed by the name search module 118 of FIG. 1. The procedure 200 also generates one or more tree structures for use by a fuzzy matching operation performed by the name search module 118. The operations shown in FIG. 2 will be explained by making cross reference to the components shown in FIG. 1.

In block 202, the index creation module 106 investigates (e.g., "crawls") source information in the source store 108 to identify information items to be indexed. Alternatively, or in addition, the source store 108 can independently forward ("push") information to the index creation module 106 for processing.

The source store 108 may provide information pertaining to individuals. Parts or elements of such of information are referred to herein as respective information items. For example, in a representative organizational setting (such as a company), the source store 108 may correspond to one or more repositories of information pertaining to individuals associated with the organization. In one case, the source store 108 can present information items regarding individuals in the form of profile documents. A person's profile document may present any collection of information items associated with that person, such as the person's name(s), expertise, supervisor(s), group affiliation(s), and so on. It is also possible that plural profile documents are associated with a single individual. In one case, block 202 operates by extracting names from the profile documents in the source store 108, as well as other information items. The information that is extracted which pertains to names is referred to as "name information" herein.

In another case, the source store 108 may represent information gleaned from contact lists. For example, the source store 108 may store the contact lists created by individuals within a company or other organization. In this case, block 202 may operate by extracting information from the contact lists for use in creating user-specific or group-specific indexes of names. As will be described below, a user can then perform a search with respect to people in his own contact list or people in a group contact list, and so on; or the user can perform a search over a more encompassing collection of people associated with multiple people's contact lists.

In general, any type of information that is extracted from any type of source store 108 that pertains to an individual is referred to herein as profile information.

In block 204, the index creation module 106 can expand the name information that it has collected from the source store 108. For example, the index creation module 106 may have extracted the name of the person "Benjamin Jeremy Stein" from the source store 108. This name corresponds to an original version of the name, since this is the version of the name as it appears in the source store 108. The index creation module 106 can expand this original version of the name by determining different versions of the name. For example, the index creation module 106 can determine a pronunciation version of the name. The pronunciation version of the name conveys the way that the name is pronounced. The index creation module 106 can optionally also determine whether there are any alternative versions of the name, such as the nicknames Ben, Benny, etc. Alternatively, if the original name is deemed to be a nickname (such as Mike), the index creation module 106 can determine the formal alternative version of the name (such as Michael).

The index creation module 106 can generate the above-described different versions of the names using various techniques. For example, in the case of pronunciations, the index creation module 106 can consult a pre-generated dictionary (not shown) which maps names to the established pronunciations of these names. Using this dictionary, the index creation module 106 can map a name as it appears in the source store 108 to its pronunciation. Alternatively, or in addition, the index creation module 106 can dynamically convert a name to its pronunciation using any one or more known tools for performing this function, such as text-to-speech conversion technology. Alternatively, or in addition, the index creation module 106 can allow individual users to specify the preferred pronunciation of their names. More generally, the index creation module 106 can allow users and other individuals to edit the pronunciation dictionary in any manner, such as by adding new entries, modifying existing entries, etc. In the case of nicknames and other name variants, the index creation module 106 can consult another pre-generated dictionary (not shown) which maps names to nicknames (and vice versa). Using this dictionary, the index creation module 106 can map a name as it appears in the source store 108 to its identified nicknames and other variants. The nicknames provided in the dictionary can represent established nicknames of individuals; in addition, or alternatively, the index creation module 106 can allow users and other individuals to edit the dictionary in any manner, such as by adding new entries, modifying existing entries, etc. The index creation module 106 can further expand the name information that it provides by generating pronunciation versions of nicknames and the like.

As a result of the operations performed in block 204, the index creation module 106 produces, for each identified person in the source store 108, a list of information items associated with this person. One information item corresponds to the original version of the name as it appears in the source store 108. Another information item corresponds to the pronunciation version of the name. Another optional information item corresponds to the alternative version of the name (e.g., the nickname version of the name). Another optional information item corresponds to the pronunciation version of the alternative version of the name, and so on. As stated, these name-related information items collectively constitute name information. The index creation module 106 can also identify other information items associated with the person, such as the person's expertise, contact information, group affiliation, and so on.

In block 206, the index creation module 106 creates the index by mapping all of the information items that it has discovered and/or generated regarding individuals with the respective individuals themselves. Consider the case of the person Ben Stein. The index creation module 106 maps all of the above-described information items associated with this person with some master reference information that represents this person. In the specific case of name information, the index creation module 106 maps all of the variants of Ben Stein's name with this individual, Ben Stein, himself. FIG. 2 graphically shows a record 208 which represents such a name-mapping operation. Block 206 stores the index that it creates in the index store 110.

In one case, the index creation module 106 creates a master index associated with all individuals identified in the source store 108. In another case, the index creation module 106 can generate multiple user-specific and/or group-specific indexes. For example, as explained above, the index creation module 106 can generate a user-specific index that identifies all of the individuals known to that user (as gleaned from the user's contact list, for instance). The index creation module 106 can consolidate such multiple indexes into a single index, while preserving attribute information that identifies the nexus between entries in the single index and the local lists associated with individual users. For example, assume that the single index includes the name "Bob Saunders." If Bob Saunders is an entry in the contact lists of individuals X, Y, and Z, then the single index could store attribute information that identifies the link between the name Bob Saunders and individuals X, Y, and Z.

Further, the above discussion is based on the simplifying assumption that the index is being created for users of a particular language, such as American-variant English. In another case, the index creation module 106 can create different indexes for different language-use environments. For example, a certain name, for example, "Stein," may be pronounced a first way in English and a second way in French. Presuming that the index is to be used in a multilingual environment, the index creation module 106 can generate a first index associated with English pronunciations and a second index for French pronunciations. Alternatively, or in addition, the index creation module 106 can generate a single index which encompasses the various ways that names might be pronounced in plural different languages, thus giving the user who is performing a search a more varied and robust selection of candidate names to consider. The index creation module 106 may also apply language-dependent rules that have a bearing on the generation of nicknames and other name variants.

In block 210, the tree creation module 112 transforms the name information in the index to one or more tree structures. The tree structure and its manner of use will be explained in greater detail below in the context of the discussion of FIGS. 7-11. By way of overview, a tree structure organizes the characters in the index names in a hierarchical data structure. One illustrative type of tree structure is a Trie structure. For example, the component name "Stein" is represented in the tree structure as a series of connected nodes associated with the characters S, T, E, I, and N. A fuzzy matching operation (to be described below) attempts to match an input name (entered by a user) with a name in the index by traversing the tree structure in a top-down step-by-step manner. The tree creation module 112 can optionally generate one or more tree structures based on different versions of the name information. For example, the tree creation module 112 can generate one or more tree structures based on the pronunciation version of the name information. The tree creation module 112 can alternatively, or in addition, generate one or more other tree structures based on the original version of the name information, and so on. Further, the tree creation module 112 can also generate one or more tree structures associated with different language-use environments.

In one implementation, all of the indexing operations described above can be performed in advance of a user's input of a particular query. In an alternative case, any one or more of the operations described above can be performed at the time that the user enters a query, e.g., at query time.

C. Searching Functionality (FIGS. 3-6)

FIG. 3 shows a more detailed depiction of the query module 116 used by the query-time functionality 104. The query module 116 accepts input information from a user, which may include an input name, one or more other query terms, as well as additional information (to be described below). The query module 116 processes the input information to provide a ranked list of one or more candidate names that are considered potential matches for the input name. If the user deems that one of these candidate names corresponds to the person he is looking for (i.e., the desired person), the user can retrieve additional information regarding this person, such as the person's contact information, etc.

It should be noted that the query module 116 represents one of many different types of query modules that can be used to generate candidate names. For instance, Section E describes other types of query modules that can be used by the system 100 of FIG. 1. Accordingly, the details provided below are to be considered representative of merely one way of generating candidate names.

As summarized above, the query module 116 includes two main blocks of functionality, namely, a name search module 118 and a ranking module 120. The name search module 118 generates a list of candidate names based on name-related considerations alone. The ranking module 120 may provide a final ranking of candidate names based on the results of the name search module 118 and one or more other factors. In one illustrative implementation, as explained above, the ranking module 120 can perform this ranking operation by ranking profile documents associated with the candidate names.

Figure 4:
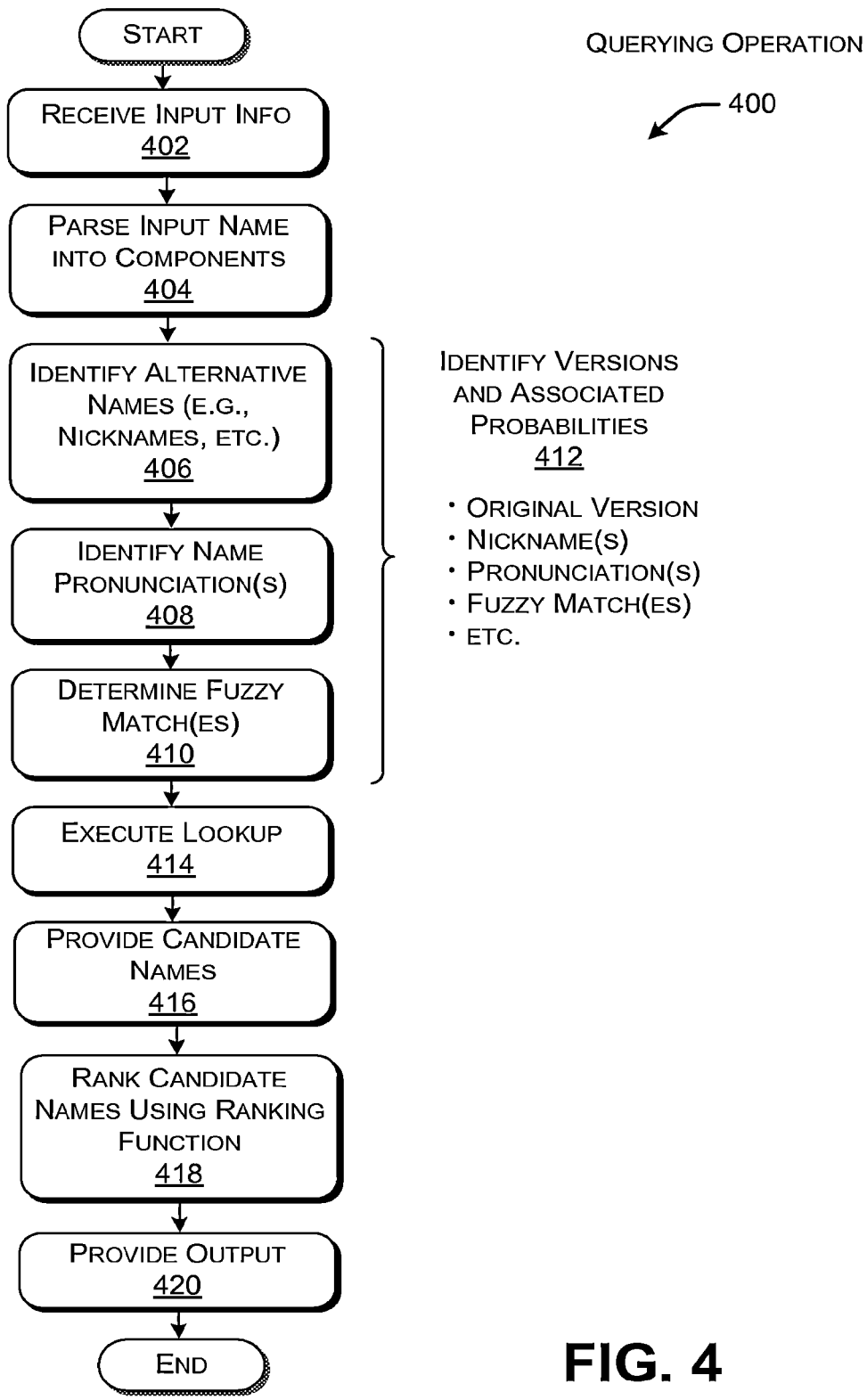
FIG. 4 shows a procedure that sets forth one illustrative manner of operation of the query module of FIG. 3.
Figure 5:
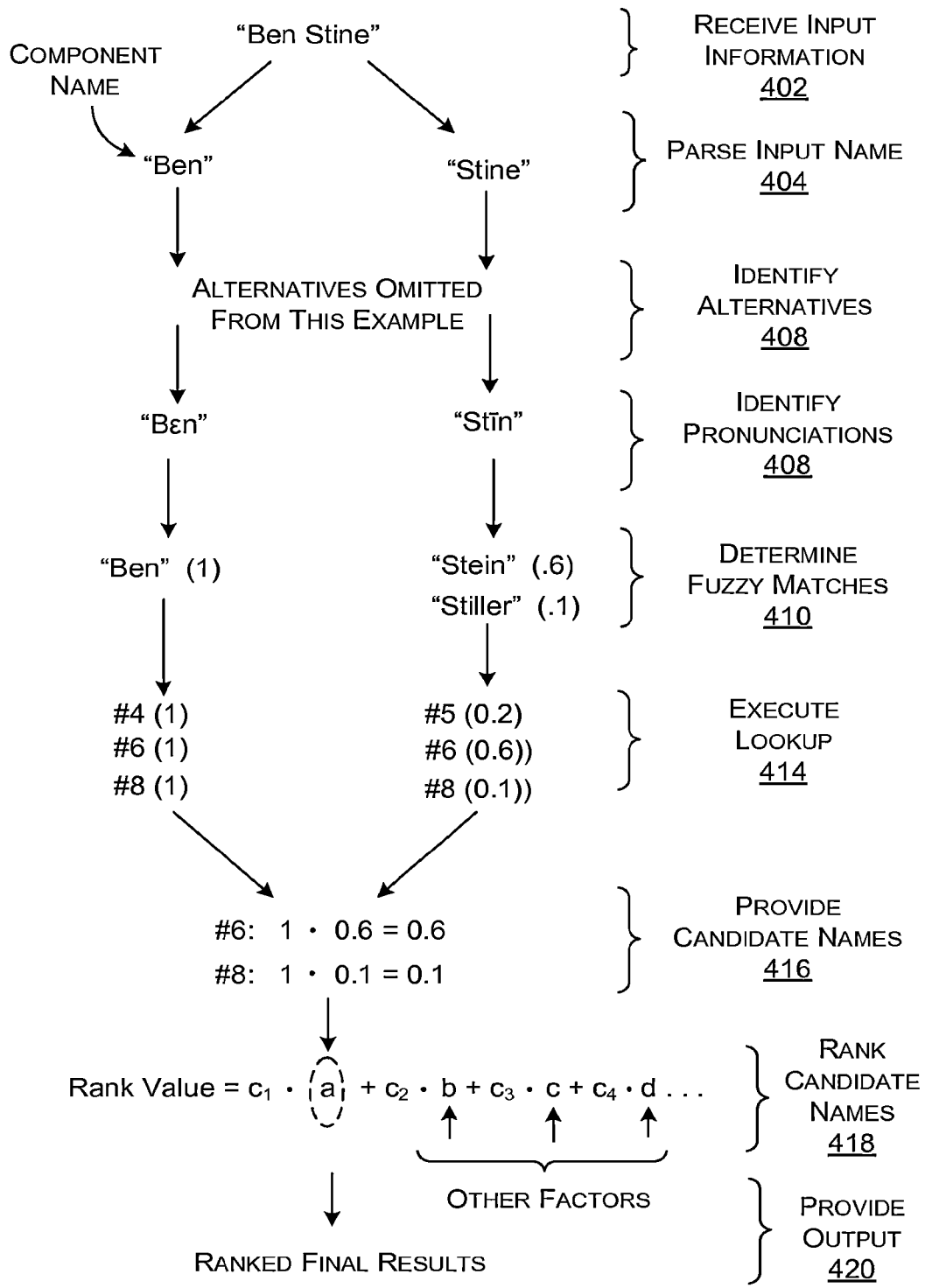
FIG. 5 is a graphical depiction that demonstrates one illustrative application of the procedure of FIG. 4.

To most effectively set forth the concepts, the query module 116 in FIG. 3 will be explained at the same time as the subject matter of FIGS. 4 and 5. FIG. 4 shows a procedure 400 for generating a ranked list of candidate names using the query module 116 of FIG. 3. FIG. 5 shows an application of the procedure of FIG. 4 to an illustrative scenario. In this specific scenario, the user is interested in finding information regarding the person identified in the index as Ben Stein. However, the user has only heard this person's name in conversation; that is, the user has never seen this person's name in writing or in print. Accordingly, the user mistakenly inputs the name of Ben Stein as "Ben Stine."

To begin with, FIG. 3 shows that the query module 116 includes an input module 302. The input module 302 corresponds to any functionality for receiving input information from the user. In one case, the input module 302 accepts the input information from the user in the form of textual information, e.g., in response to the user typing in the person's name using a keyboard or other input device. The input module 302 can also accept the input information in other forms. For example, the input module 302 can include known voice recognition functionality to convert spoken information (received by a microphone) into a stream of input text for processing. In one example, the query module 116 can be used in a telephone directory environment or the like; here, the input module 302 receives the spoken information over telephone communication infrastructure or other type of communication infrastructure. The input module 302 can also include known optical character reader (OCR) functionality to convert optical character signals (received by a character scanning device) into a stream of input text for processing. The input module 302 can also include known handwriting recognition functionality for converting scanned handwriting signals (received by a handwriting scanning device) into a stream of input text for processing. The input module 302 can include yet other types of functionality for accepting input information.

As stated, the input information can include name information. The input information can optionally also include one or more query terms. The input information can optionally include other information. In one case, the user can input a series of words (and other information) without characterizing this information. For example, the user can input "John Hill accountant," which includes name information ("John Hill") and job title information ("accountant"). Alternatively, or in addition, the user can provide descriptive terms which help the query module 106 interpret the input information. For example, the user can enter FirstName: John, SecondName: Hill, JobTitle: accountant (via typed input, spoken input, scanned input, etc.). The merely representative terms FirstName, SecondName, and JobTitle identify the given name, family name, and job title of the person that the user is attempting to locate. The query module 106 can be configured to examine the input information for the presence of a predetermined collection of descriptive terms of this nature, and then interpret the input information accordingly. Alternatively, or in addition, the user can separate name information from query terms using a predetermined character or characters (such as a comma), and the query module 106 can be configured to discriminate between these two fields based on the presence of the predetermined character(s).

As another feature, in one case, the user does not expressly identify the language-use environment in which he is operating. In this case, the query module 106 can automatically determine the language-use environment, e.g., by detecting that the user has input the word "accountant," which corresponds to a job title in the English language. Alternatively, or in addition, the query module 106 can process the user's input information in a language-agnostic manner. For example, assume that the user inputs the first name "Jean." The query module 106 can process this input based on both the English pronunciation of this term and the French pronunciation of this term, and then provide a list of candidate names which ensue from the union of both options. Alternatively, or in addition, the query module 106 can determine the language-use environment of the user based on any kind of express setting. For example, the user may set up preference information which identifies his or her preferred language-use environment. For example, the query module 106 can discover that the user has set up her browser to operate in the English language; the query module 106 can then process the user's input information accordingly based on this setting. Alternatively, or in addition, the user can specify the preferred language-use environment as part of the input information, and so on. As noted, the following explanation will be based on the simplifying assumption that the user is operating in an English language-use environment.

With reference to FIGS. 4 and 5, block 402 corresponds to the above-described input operation. In the specific scenario described above, the user has entered the name Ben Stine with the hopes of locating information regarding the individual Ben Stein. As mentioned, the user can also enter other information regarding Ben Stein, such a query term that identifies the expertise of Ben Stein (e.g., "game show host," etc.). The user may enter this supplemental information because he is aware that Ben Stein once hosted a game show. The user offers this piece of information as additional guidance to the query module 116 in generating a relevant list of candidate names (in a manner to be described below with respect to the ranking phase of the search operation).

In the above example, the user enters both a first name ("Ben") and a last name ("Stine"). As such, the processing shown in FIG. 5 (and to be described below) is performed on two component names. But this is only one example. In another case, the user may enter just the first name or just the last name of a desired person. (Whether or not the user is statistically more likely to enter the first name or the last name may depend on the environment in which the query module 116 is applied.) Alternatively, the user can enter more than two component names. The query module 116 can process any of these input permutations.

Returning to FIG. 3, the query module 116 also includes a name parsing module 304. The name parsing module 304 corresponds to any functionality for breaking the received input name into its component names. If the input module 302 receives the input name in the form of textual information, the name parsing module 304 can identify its component parts based on the presence of spaces between character strings (for languages in which spaces are used to separate component names). If the user does not type spaces between component names (because, for instance, that is the conventional way to type a name in a particular language-use environment), the parsing module 304 can identify the component names using probabilistic analysis; for instance, the probabilistic analysis can compare parts of the input information to names provided in one or more dictionaries to appropriately segment the input information. If the input module 302 receives the input name in the form of spoken information, the name parsing module 304 can identify its component parts based on the presence of temporal pauses between character strings, and so on.

The parsing module 304 may also include functionality for classifying the input information. For example, the parsing module 304 can discriminate name information from query terms. In one technique, the parsing module 304 can, in part, consult a dictionary to make this determination. For example, the parsing module 304 can determine that the word "accountant" likely corresponds to a query term because the dictionary identifies this word as a common (not proper) noun. Alternatively, or in addition, the user can assist the parsing module 304 by expressly characterizing parts of the input information in the manner described above. For example, the parsing module 304 can interpret "John" as a given name if it is input as FirstName: John, and so on.

In one case, the parsing module 304 can be configured to identify abbreviations (including initials) within name information (such as Mr., Mrs., Ms., Jr., Sr., etc.). The query module 106 can then process this information as component parts of the input name. In another case, the parsing module 304 can ignore some of this information or all of this information.

With reference to FIGS. 4 and 5, block 404 corresponds to the above-described parsing operation. In one specific scenario, the user has entered the name Ben Stine. In block 404, the name parsing module 304 parses the input name into its component names, including a first component name "Ben" and a second component name "Stine." The component names as originally input by the user are referred to as the "original versions" of the component names. The qualifier "original" indicates that these component names correspond to name information as originally entered by the user.

Returning to FIG. 3, the query module 116 also optionally includes an alternative name determination module 306. The alternative name determination module 306 corresponds to any functionality for determining whether there are other variants of the component names identified by the name parsing module 304. To make this determination, the alternative name determination module 306 can rely on a name dictionary provided in a dictionary store 308. The name dictionary can correlate different versions of names. For example, the name dictionary can map an input name to its nicknames, and vice versa (that is, by mapping an input nickname to the formal version of the name). The name dictionary can include established name variants. Moreover, the user may be allowed to edit the name dictionary in any manner, such as by modifying dictionary entries, adding new dictionary entries, and so on.

With reference to FIGS. 4 and 5, block 406 corresponds to the above-described operation of determining alternative names. In one scenario, the alternative name determination module 306 can consult the name dictionary to determine that the input component name "Ben" is associated with the names "Benjamin" and "Benny." The additional names identified in block 406 are referred to as "alternative versions" of the entered name. They are alternative versions because they are variants of the original version of the name entered by the user.

Returning to FIG. 3, the query module 116 also includes a pronunciation determination module 310. The pronunciation determination module 310 corresponds to any functionality for converting the original versions of the component names into their pronunciation version counterparts. To perform this task, the pronunciation determination module 310 can dynamically generate the pronunciation version of each component name at query time. That is, the pronunciation determination module 310 can rely on conversion rules provided in a rules store 312. Known tools exist for dynamically converting original text into a pronunciation version of the original text, such as functionality used by text-to-speech technology.

Alternatively, or in addition, the pronunciation determination module 310 can rely on a pronunciation dictionary provided in a pronunciation dictionary store 314. The pronunciation dictionary is a pre-generated resource which maps names to their pronunciations. The pronunciation determination module 310 uses the pronunciation dictionary to translate each component name into its accepted pronunciation version counterpart. The pronunciation of the component name can be expressed in textual form by using appropriate pronunciation characters. The pronunciation dictionary can include established pronunciations of names. Moreover, the user may be allowed to edit the pronunciation dictionary in any manner, such as by modifying dictionary entries, adding new dictionary entries, and so on. For instance, through this editing capability, a user can specify idiosyncratic or otherwise unusual pronunciations for certain names.

As explained above, the query module 104 can perform different analyses based on the language-use environment in which the user is operating. In this case, the pronunciation determination module 310 can apply different dictionaries for different languages. Further, the pronunciation determination module 310 can apply different rule sets for use in dynamically generating pronunciations.

As noted above, in one implementation, the query module 106 may input name information using voice recognition technology. In this case, the voice recognition technology can provide pronunciation information that can be used to assist the pronunciation determination module 310 in determining the pronunciation of the name information. Alternatively, in the case that voice recognition technology is used, the pronunciation determination module 310 can be eliminated in its entirety.

With reference to FIGS. 4 and 5, block 408 corresponds to the above-described pronunciation-determination operation. In one specific scenario, the pronunciation determination module 310 can convert the component names "Ben" and "Stine" into their counterpart pronunciation versions, such as "Ben" and "Stine." The specific pronunciation characters in these names are merely representative; any character notation can be used to express the pronunciation information. In one case, an administrative user may find that different character notations may affect the performance of the fuzzy matching operation in different ways; the administrative user can select the character notation that provides desirable results for a particular environment. The text strings which represent the pronunciations of the original versions of the component names are referred to as the pronunciation versions of the component names.

The pronunciation determination module 310 can also generate pronunciation versions of the alternative names identified in block 406. However, so as not to obfuscate the discussion with unnecessary detail at this juncture, FIG. 5 omits this operation. Namely, FIG. 5 indicates that the pronunciation determination module 310 only generates pronunciation versions corresponding to the original versions of the component names as entered by the user, namely Ben and Stine.

Returning to FIG. 3, the query module 116 also includes a fuzzy matching module 316. One way in which the fuzzy matching can operate will be explained in the next section (i.e., Section D). By way of overview, the fuzzy matching module 316 uses the tree structure in the tree store 114 to determine names in the index that are similar to the input name. These similar names are referred to as fuzzy matches herein. In some cases, a fuzzy match will exactly match the name information that is entered into the fuzzy matching module 316. Other fuzzy matches may be generally similar to the name information that is entered into the fuzzy matching module 316, but not exactly the same. For each fuzzy match, the fuzzy matching module 316 provides a fuzzy match score. The fuzzy match score reflects an extent to which the fuzzy match resembles the name information that is input to the fuzzy matching module 316. If there are no names in the index that are sufficiently similar to the input name information, then the fuzzy matching module 316 can potentially identify no fuzzy matches.

The fuzzy matching module 316 can perform its analysis on each component name in the input name. For example, if the use inputs Ben Stine, then fuzzy matching is performed on Ben, and then, as a separate operation, Stine. More specifically, the fuzzy matching module 316 can perform fuzzy matching based on any version of each component name, or any combination of versions. For example, the fuzzy matching module 316 can accept a pronunciation version of a component name as an input and generate one or more fuzzy matches that reflect names in the index that are similar to the pronunciation version of the component name. For example, the fuzzy matching can be performed on "Ben," and then "Stine." In addition, or alternatively, the fuzzy matching module 316 can accept an original version of the component name (Ben or Stine) as an input and generate one or more fuzzy matches that reflect names in the index that are similar to the original version of the component name. To operate in this manner, the fuzzy matching module 316 can make use of multiple different tree structures. For example, to perform fuzzy matching based on a pronunciation form of an input name (e.g., Ben), the fuzzy matching module 316 can rely on a tree structure that expresses the names in the index in the realm of pronunciations. To perform fuzzy matching based on the form of the name as originally input by the user (e.g., "Ben"), the fuzzy matching module 316 can rely on a tree structure that expresses the names in the index in the realm of original spellings.

As mentioned above, the fuzzy matching operation can use tree structures having different respective scopes. In one case, the tree structure that is used represents all names identified in the source store 108. In another case, the tree structure that is used (or the part of a tree structure that is used) represents all names in a user's contact list or a relevant group contact list, and so on.

With reference to FIGS. 4 and 5, block 410 corresponds to the above-described fuzzy matching operation. To facilitate discussion, assume that the fuzzy matching is performed on the original versions of the input name, although, as stated, it can also (or alternatively) be performed on the pronunciation versions of the input name (and/or some other version(s)). In one specific scenario (shown in FIG. 5), the component name Ben (in its original version) is entered into the fuzzy matching module 316. In response, the fuzzy matching module 316 generates a fuzzy match of "Ben," which exactly matches the name that was input. Because there is an exact match, the fuzzy matching module 316 can assign a fuzzy match score of 1.0 to this fuzzy match (in a manner to be described below).

Now assume that the other component name "Stine" (as misspelled) is entered into the fuzzy matching module 316. In response, the fuzzy matching module 316 generates two fuzzy matches of "Stein" and "Stiller." Neither fuzzy match exactly matches the component name that was entered (Stine). Thus, the fuzzy matching module 316 assigns a fuzzy match score to each fuzzy match that is less than 1.0. In one merely representative example, the fuzzy matching module 316 assigns a fuzzy match score of 0.6 to "Stein" and 0.2 to "Stiller." The difference in scores reflects the finding that "Stein" is a closer match to "Stine" (which was entered by the user) than "Stiller." Since the tree structure used to generate the fuzzy matches is based on the index, both "Stein" and "Stiller" correspond to individuals for which the source store 108 stores information. "Stein" is in fact the person that the user is looking for, associated with the entry "Ben Stein." Again note that this operation can be performed in the realm of pronunciations. In this case, the fuzzy match score for "Stein" would be potentially higher than 0.6 because the entered component name "Stine" is phonetically very close to "Stein" in English, if not identical.

FIG. 4 indicates that blocks 406, 408, and 410 can be grouped together and conceptually regarded as a single aggregate block 412. In aggregate block 412, the query module 116 expands the input name into multiple different versions. The query module 116 also assigns a score to each of the versions. Consider, for example, the component name "Ben." The query module 116 expands this component name into an alternative name version, a pronunciation version based on the original version of the name, a pronunciation version based on the alternative name version of name, and so on. By virtue of the fuzzy matching performed in block 410, the query module 116 further expands any version (or versions) of the input name into one or more fuzzy match versions. The query module 116 also assigns a score to each fuzzy match that it generates.

In the example cited above, the fuzzy matching module 316 acts as the sole agent for assigning scores to the matches. Alternatively, or in addition, the query module 116 can apply additional considerations when assigning scores to the matches. Consider the specific scenario in which the alternative name determination module 306 generates the additional component name "Benjamin" as a possible alternative for the component name "Ben" which was entered by the user. In one case, the query module 116 can deem that the name "Benjamin" is equivalent to "Ben," such that both component names would have the presumptive score of 1.0 going into the fuzzy matching operation. In another case, the query module 116 can discount the name "Benjamin" to reflect the fact that the user himself decided to input the name "Ben," rather than "Benjamin." In this case, the query module 116 can assign the component name "Benjamin" a score of 0.9 (as merely one example) going into the fuzzy matching operation, instead of 1.0. Thus, if the fuzzy matching operation produces an exact match for the name "Benjamin," that match will have the fuzzy match score of 0.9, not 1.0. If there is a similar match for Benjamin (but not exact), the fuzzy match score of the similar match will be less than 0.9. More generally, this scenario serves to make the point that the scores assigned in aggregate block 412 can be based on a combination of considerations, not just the degree of string similarity assessed by the fuzzy matching module 316. Block 412 can thus be considered as any general process for expanding the name information entered by the user into different versions and assigning scores to these different versions, however implemented in a particular environment.

In another scenario, the user may input the name information using some form other than key input, such as voice recognition input, OCR input, handwriting recognition input, and so on. In these examples, the input module 302 can generate the name information by attempting to match input data (received from a microphone, scanner, etc.) with predetermined information, such as predetermined characters, phonemes, words, etc. In one illustrative case, upon the user's entry of input data, the input module 302 can identify one or more potentially matching input names, each having a predetermined level of confidence. The level of confidence for an input name may reflect the extent to which the input data matches the predetermined information. For example, assume that the user inputs the name "John Stern" using handwriting recognition functionality. In one merely representative case, the input module 302 can generate potentially matching names corresponding to "John Stern" with a confidence of 0.95, "John Slern" with a confidence of 0.85, and "John Storm" with a confidence of 0.80.

In one case, the query module 106 can process all three of these names as potentially valid input names. For instance, the query module 106 can potentially generate alternative name versions and pronunciation versions for each of these three name variants (John Stern, John Slern, and John Storm, etc.). The probabilities going into the fuzzy matching operation can be offset based on the confidence scores initially assessed by the input module 302. In this case, for instance, "John Storm" can produce a best possible fuzzy match score of 0.80 if there is a name in the index which exactly matches the name "John Storm."

Returning to FIG. 3, the query module 116 also includes lookup module 318. The lookup module 318 represents any functionality for performing a lookup operation in the index based on the fuzzy matches identified by the fuzzy matching module 316. The lookup module 318 performs this operation for each component name (and for each version of each component name). The outcome of the lookup operation is one or more lookup results (according to the terminology used herein). For a particular fuzzy match, a lookup result identifies one or more names in the index that match that fuzzy match. There will in fact be at least one name in the index that matches the fuzzy match. This is because the fuzzy matching operation is performed using a tree structure, and that tree structure is, in turn, built from names in the index. FIG. 3 shows that the lookup module 318 interacts with the index store 110 to perform the above-described lookup operation.

With reference to FIGS. 4 and 5, block 414 corresponds to the above-described lookup operation. Consider first the fuzzy match "Ben." The lookup operation yields lookup results associated with three individuals in the index, denoted by records #4, #6, and #8. Each of these lookup results includes the component name "Ben." For example, assume that record #4 corresponds to the name "Ben Afflect." Assume that record #6 corresponds to the name "Ben Stein." Assume that record #8 corresponds to the name "Ben Stiller." Next consider the fuzzy matches for "Stine," namely, "Stein" and "Stiller." Assume that record #5 corresponds to the name "Gertrude Stein" (where this record matches the first fuzzy match "Stein"). Assume that record #6 is the same record identified above, corresponding to "Ben Stein" (where this record matches the first fuzzy match "Stein"). Assume that record #8 is the same record identified above, corresponding to "Ben Stiller" (where this record matches the second fuzzy match "Stiller"). These lookup results reflect merely one example for discussion purposes; in practice, any lookup operation can yield addition lookup results, or fewer lookup results. FIG. 5 illustrates that each lookup result inherits the fuzzy sore of its associated fuzzy match, such that, for example, "Gertrude Stein" has a fuzzy match score of 0.6 because the fuzzy match "Stein" has a fuzzy match score of 0.6.

Returning to FIG. 3, the query module 116 also includes a scoring module 320. The scoring module 320 represents any functionality for combining the lookup results provided by the lookup module 318 for all component names. The scoring module 320 generates one or more candidate names. Each of the candidate names has a probability score associated with it which reflects a level of confidence that this candidate name matches the name input by the user. More generally stated, the probability score reflects the likelihood that the candidate name matches the person that that the use is looking for.

With reference to FIGS. 4 and 5, block 416 corresponds to the above-described scoring operation. As most clearly shown in FIG. 5, this operation proceeds by first forming the intersection of the lookup results associated with the component name "Ben" and the lookup results associated with the name "Stine." In one implementation, the scoring module 320 retains those records that match both component names. For example, record #6, associated with "Ben Stein," is retained because it matches both lookup results for the component name "Ben" and the lookup results for the component name "Stine." Record #8, associated with "Ben Stiller" is retained for the same reason.

Next, the scoring module 320 assigns a probability score to each of the candidate names that survive the intersection operation. In one case, the scoring module 320 can assign a probability score to each candidate name that is the product of the fuzzy match scores associated with its component parts. For example, record number #6, Ben Stein, is associated with a fuzzy match score of 1.0 for "Ben" and a fuzzy match score of 0.6 for "Stine," making a resultant probability score of 1.0.times.0.6=0.6. Record #8, Ben Stiller, is associated with a fuzzy match score of 1.0 for "Ben" and a fuzzy match score of 0.1 for "Stine," making a resultant probability score of 1.0.times.0.1=0.1.

As a first point of clarification, note that, as presented above, the fuzzy matching operation in block 410, the lookup operation in block 414, and the scoring operation in block 416 are performed on the original version of the input name. In addition, or alternatively, this series of operations can be performed on one or more other versions of the input name, such the pronunciation version, the alternative name version, and so on. For example, in one case, these operations can be performed on both the original version of the input name and the pronunciation version of the input name. This will provide a robust collection of candidate names from which to choose. For example, the pronunciation version of "Stine" phonetically resembles the desired name of "Stein" in English. Thus, the processing performed on the pronunciation version of the name may provider stronger results than the processing performed on the original version of the name. And thus, the processing performed in the realm of pronunciations can potentially make up for any weakness in the processing performed in the realm of original spellings. This scenario also illustrates how it can be said that the query module 116 is relatively tolerant of input errors made by the user.

As another point, note that, in addition to being relative tolerant of misspellings, the query module 116 can also provide robust results for the case in which the user omits one or more component names associated with a desired name in the index, or for the case in which the user enters an extra component name that is not provided in the index. For example, assume that the name in the index associated with the desired person is Ben Jeremy Stein. Although the user did not enter the component name Jeremy, he will nevertheless receive relevant candidate names for his consideration. Similarly, assume that the user did in fact input Ben Jeremy Stein, but the index stores this name as simply Ben Stein. Again, the query module 116 will generate relevant candidate names for the user's consideration.

As to this last example (in which the user enters three or more component names), it was previously pointed out that the scoring module 320 generates candidate names based on the intersection of the lookup results generated for all of the component names. This operation can be modified to relax the way in which an intersection is formed. For instance, the scoring module 320 can be modified to retain candidate names that match any two or more component names as input by the user (or, in yet another example, any one or more component names as input by the user). This will have the effect of not penalizing candidate names that do match all of the component names entered by a user. Alternatively, or in addition, the scoring module 320 can adjust the probability score that it assigns to a candidate name to reflect the situation in which the candidate name includes more component names than input by the user, or the situation in which the candidate name includes fewer component names than input by the user. For example, if the user enters "Ben Smith Stein Imports" with the intention of retrieving "Ben Smith" who imports beer steins from Germany, the scoring module 320 can penalize the possible candidate name "Ben Stein" because this name omits the middle name "Smith" in the input name.

The query module 116 can also produce candidate names that are tolerant of the order in which the user inputs component names. Consider the scenario shown in FIG. 5. The query module 116 will produce the same results regardless of whether the user inputs Ben Stein or Stein Ben. In an alternative case, the scoring module 320 can adjust the probability score that it assigns to a candidate name to reflect discrepancies between the ordering of component names in the input name compared to the candidate name.

Further, the scoring module 320 can generate probability scores which reflect additional rules. For example, the scoring module 320 can boost the score of a candidate name if it exactly matches the last name of an input name, but the scoring module 320 may not similarly boost the score if the candidate name only exactly matches the first name of the input name. This is because, in some language-use environments, the family name of a person is typically more unique than the person's given name, thus making a match of the family name more significant than a match of the given name. In addition, or alternatively, the scoring module 320 can apply language-specific rules in generating probability scores. This is because different language-use environments may have different respective norms. Still other modifications are possible.

In the case in which the user only inputs one component name, e.g., "Ben," the name search module 118 can identify all candidate names which include "Ben" (or a similar component name) as part thereof.

Returning to FIG. 3, the candidate names provided by the scoring module 320 represent the output of name search module 118 as a whole. In one implementation, the query module 116 can generate final output results based on the output of the scoring module 116. In this case, the candidate name that has the highest probability score will correspond to the candidate name most likely to match the input name, as assessed by the query module 116.

In another implementation, the query module 116 can include the above-described ranking module 120. A full discussion of the ranking module 120 will be provided in Section E of this disclosure. By way of overview, in one implementation, the ranking module 120 can assign a rank value to each of the candidate names identified by the name search module 118. The rank value is based on a ranking function. The ranking function, in turn, may be a function of plural factors. An optional one of these factors is a name search factor. The name search factor corresponds to the probability score assigned to the candidate name by the scoring module 320. The scoring module 320 can optionally provide other information which can be used for the purpose of ranking candidate names. For example, the scoring module 320 can provide information which indicates whether there is any type of mismatch between the component names in an input name and a candidate name under consideration (e.g., because the input name includes additional or fewer component names than the candidate name, or the input name includes a different ordering of component names than the candidate name, and so on). Thus, the scoring module 320 can generate multiple types of name search factor values. Alternatively, the scoring module 320 can generate a single probability score which is based on multiple different characteristics of a match between an input name and a candidate name under consideration. The ranking function may be based on other types of factors, as will be described below in Section E.

With reference to FIGS. 4 and 5, block 418 corresponds to the above-described ranking operation. FIG. 5, in particular, shows the illustrative use of a linear ranking function. The ranking function, as noted above, determines a rank value for a candidate name based on multiple factors, represented by variables a, b, c, etc. The ranking function may apply respective weights ($c_1$, $c_2$, $c_3$, etc.) to the variables.

In one illustrative implementation, assume that the factor a represents the probability score assigned by the scoring module 320. For example, a value of 0.6 will be substituted for this variable when computing the rank value for the name "Ben Stein." The other factors in the ranking function may either strengthen or weaken the relevance of a candidate name relative to other candidate names. For example, assume that there are two employees in a company who have similar names, one of which goes by the name Ben Stein, and the other of which goes by the nickname Benny Stein. If the user inputs the name "Ben Stine," the name search module 118 will give a higher probability score to the person "Ben Stein," rather than "Benny Stein." But other factors in the ranking function may change this relative ordering. For example, assume that the user enters the input information "Ben Stein, test engineer." Assume that the person "Ben Stein" is not a test engineer, but the person "Benny Stein" is a test engineer. In this case, the ranking function may elevate the relevance of Benny Stein relative to Ben Stein. This is assuming that one of the other factors in the ranking function expresses the correspondence between a user's supplemental query term ("test engineer" in this case) and a candidate name's expertise.

Note that the pairing of the ranking module 120 with the specific type of name search module 118 described above is merely representative. That is, the ranking module 120 can be used in conjunction with other types of name search modules that operate based on other paradigms. In general, the ranking module 120 can work in cooperation with any name search module that generates a plurality of candidate names. Each of the candidate names can have one or more matching characteristics (e.g., scores) associated therewith, however generated. Section E (below) describes additional illustrative implementations of the ranking module 120.

Finally, FIG. 3 shows that the query module 116 includes an output module 322. The output module 322 generates a list of one or more candidate names as provided by either the output of the scoring module 320 or the output of the ranking module 120. The output module 322 can provide a list in any fashion, such as by displaying such a list on a display device, by speaking the list to the user via a voice synthesizer (e.g., over the telephone, etc.), and so on. The output module 322 can order the candidate names in the list based on, for example, the rank values assigned to the candidate names by the ranking module 120. Alternatively, the output module 322 can generate a list of names that satisfy a prescribed threshold of appropriateness; in this case, the list may be ordered (e.g., alphabetically ordered) or unordered. Block 420 in FIG. 4 corresponds to the output operation performed by the output module 322.

Figure 6:
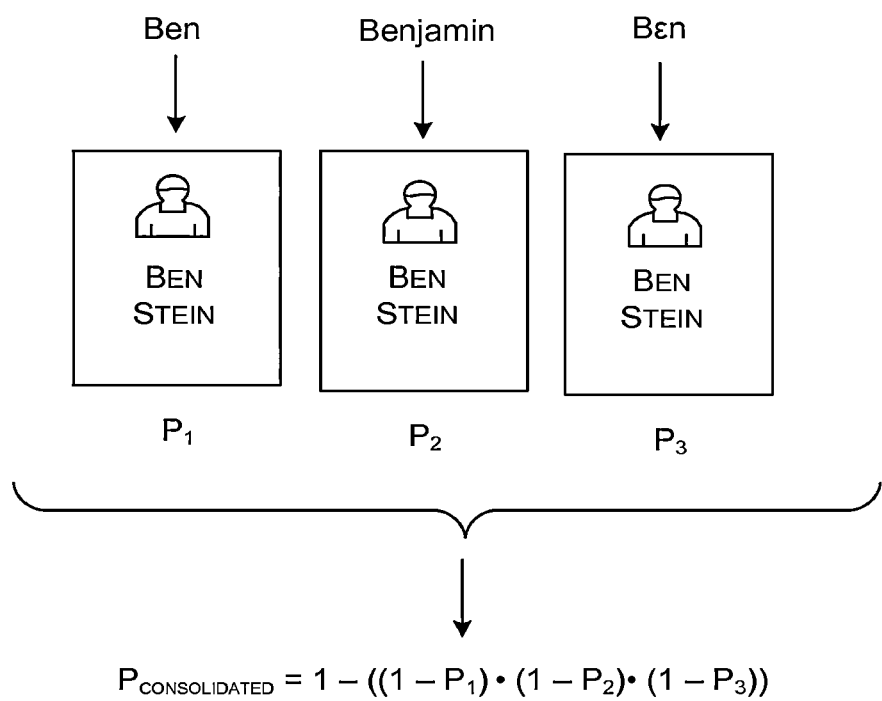
FIG. 6 is a graphical depiction that shows one illustrative way in which the procedure of FIG. 4 can resolve a situation in which plural versions of the input name map to a same candidate name.

FIG. 6 is a graphical depiction that shows one illustrative way in which the procedure of FIG. 4 can resolve a situation in which plural versions of the input name map to a same candidate name. For instance, assume that the query module 116 generates an alternative name version of the input name "Ben" corresponding to "Benjamin." Also assume that the query module 116 generates a pronunciation version of the name Ben as "B.epsilon.n." Next assume that the query module 116 generates candidate names based on multiple versions, including the original version (Ben), the alternative name version (Benjamin), and the pronunciation version (B.epsilon.n). It is likely that one or more of these versions of the input name will map to the same candidate name (namely, Ben Stein). It is also possible that one or more of these versions will map to the candidate name with different respective fuzzy match scores. FIG. 6 shows an approach for addressing this situation.

In the approach taken in FIG. 6, a consolidated fuzzy match score is computed for the candidate name Ben Stein based on the fuzzy match scores associated with the different versions. One equation that can be used to provide such a consolidated fuzzy match score is:

$$p_{consolidated} = 1 - \Pi(1-p_i), \text{(taken over all } p_i\text{)},$$

where $p_{consolidated}$ is the consolidated fuzzy match score associated with the candidate name, and $p_i$ is an individual fuzzy match score associated with a version of the input name. The product is taken over all fuzzy match scores associated with the versions that led to the candidate name under consideration. For example, assume that the original version (Ben) led to the candidate name with a fuzzy match score of $p_i$, the alternative name version (Benjamin) led to the candidate name with a fuzzy match score of $p_2$, and the pronunciation version (Ben) lead to the candidate name with a fuzzy match score of $p_3$. In this example, the consolidated probability, $p_{consolidated}$, is equal to $1-((1-p_i) \cdot (1-p_2) \cdot (1-p_3))$.

D. Fuzzy Matching Functionality (FIGS. 7-11)

Figure 7:
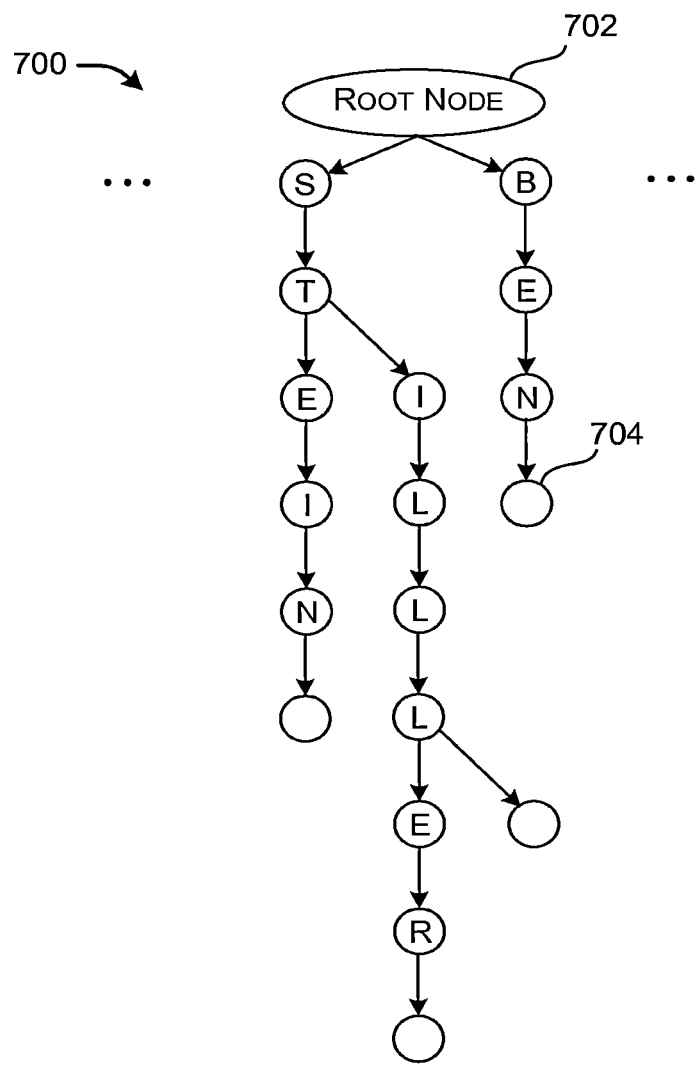
FIG. 7 shows a representative part of an illustrative tree structure (such as a Trie structure) used in performing a fuzzy matching operation within the procedure of FIG. 4.

FIG. 7 shows a small part of an illustrative tree structure 700 created by the tree creation module 112 of FIG. 1. One illustrative type of tree structure is a Trie structure. The fuzzy matching module 316 uses the tree structure 700 in performing the fuzzy matching operation. The tree creation module 112 creates the tree structure based on name information in the index, which, in turn, reflects actual names extracted from the source store 108. In the particular case shown in FIG. 7, the tree structure is formed based on the original versions of the names in the index. The tree creation module 112 can generate other types of tree structures based on other types of name information. For example, the tree creation module 112 can generate a tree structure based on the pronunciation versions of the names in the index. The tree creation module 112 can also generate tree structures that are specific to particular language-use environments. The fuzzy matching module 316 performs the fuzzy matching operation using one type of tree structure or multiple types of tree structures.

The tree structure 700 organizes the characters in the names in the index in a hierarchical data structure. That is, the nodes in the tree correspond to characters in the names (note that, if the tree structure 700 was formed based on the pronunciation versions of the names, then the characters would be symbols that convey the pronunciation-related content of the names). The topmost element of the tree structure 700 is a root node 702. The tree structure 700 terminates in a collection of empty child nodes, such as representative empty child node 704. A path in the tree structure 700 between the root node 702 and a particular empty child node spells out a component name in the index. For example, the path between the root node 702 and the empty child node 704 spells the component name Ben. The paths taken by two or more names in the tree structure 200 may overlap in part due to commonality in their characters. For example, the tree structure 700 shows that the names "Stein" and "Stiller" share the two initial characters, "s" and "t." After that point, the two names diverge in separate branches of the tree structure 700, terminating in their own respective empty child nodes. In alternative implementations, characters can be associated with the tree structure in different ways than is shown in FIG. 7.

The fuzzy matching module 316 operates by attempting to match an input component name (henceforth simply "input name" for brevity) with a similar name expressed by the tree structure 700. In some cases, the fuzzy matching module 316 can find an exact match between the input name and a name in the tree structure 700. In other cases, the fuzzy matching module 316 can find one or more names in the tree structure 700 that are similar to the input name, but not the same. To perform this matching operation, the fuzzy matching module 316 proceeds by attempting to match, on a character by character basis, characters in the input name with characters in the tree structure 700.

Figure 8:
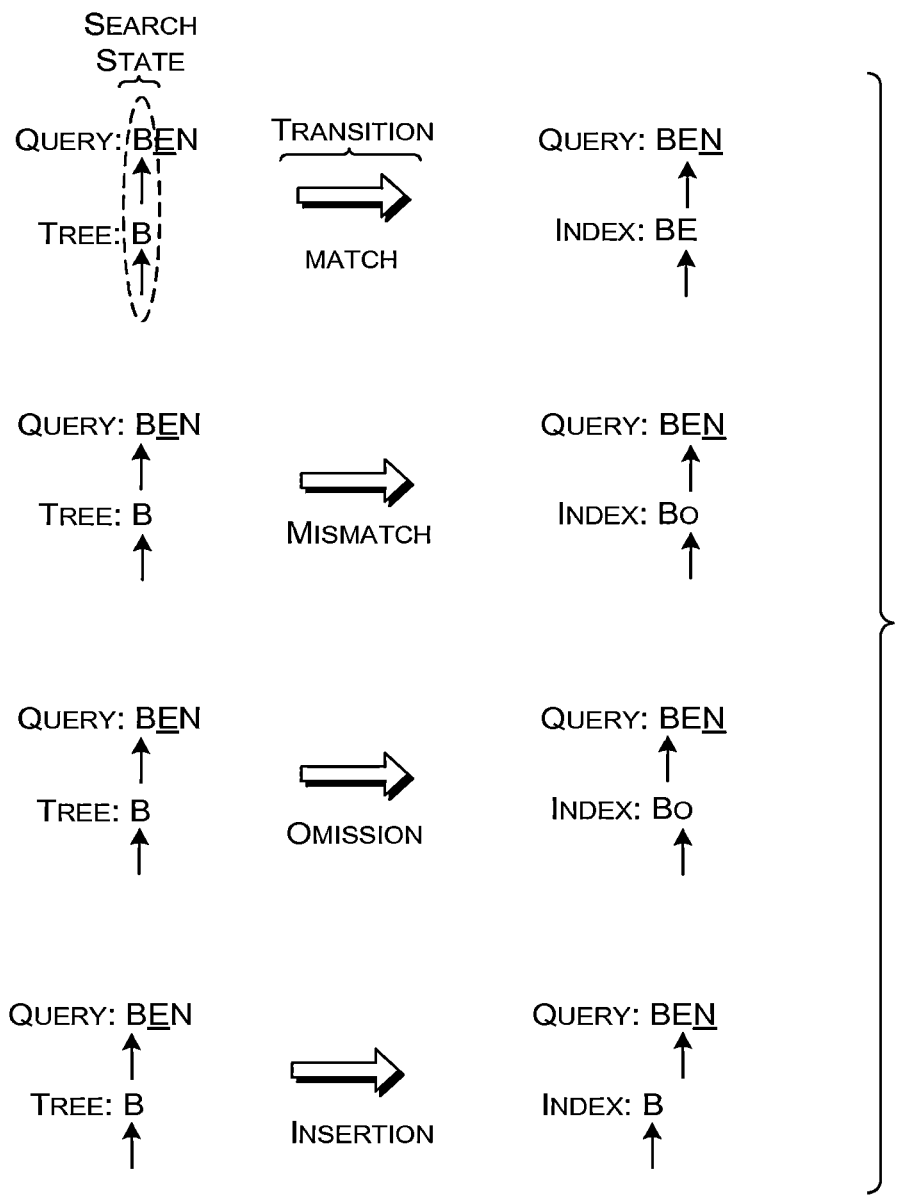
FIG. 8 is a graphical depiction that shows different illustrative ways of transitioning from one search state to another search state in the tree structure of FIG. 7.
Figure 9:
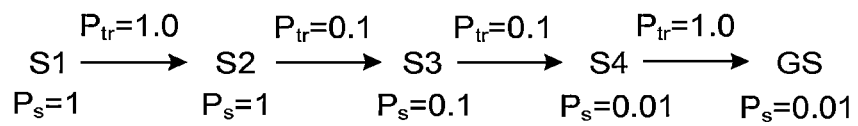
FIG. 9 is a graphical depiction that shows one illustrative way of determining a confidence value of a goal state within the tree structure of FIG. 7.

FIG. 8 shows one way in which fuzzy matching can proceed on a character-by-character basis. As to terminology, a "search state" defines a particular state within the tree structure 700 defined by two pointers: a query pointer and a tree pointer. The query pointer points to a character in the input name. The tree pointer points to a character within the tree structure. The matching proceeds by transitioning from one search state to another, with the aim of arriving at a state in which the tree pointer points to a node that has an empty child node and the query pointer points to the last character in the input name. This state is referred to as a goal state. The goal state represents a particular path through the tree structure 700, which, in turn, represents a name in the index.

FIG. 8 particularly shows four different illustrative ways of transitioning from one search state to another. Assume that, for all scenarios, the fuzzy matching module 316 has successfully matched the first character of the input name "Ben" with a corresponding character in the tree structure 200, namely, "B." This, then, defines the current search state. Both the query pointer and the tree pointer point to the character "B." The fuzzy matching module 316 next seeks to match the character "e" in the input name with the same character in the tree structure 700. This describes one use of the pointers; other implementations are possible. For example, the query pointer can instead point to a character that needs to be matched next, and so on.

The first scenario shown in FIG. 8 corresponds to a match-type transition. In this scenario, the fuzzy matching module 316 finds the character "e" among the available transition choices within the tree structure 700, thus providing a match for the character "e" in the input name. The two pointers are then both moved forward to define a new search state.

The second scenario shown in FIG. 8 corresponds to a mismatch-type transition. In the case of a mismatch, the fuzzy matching module 316 moves both pointers ahead even though the character in the input name does not match the character in the tree structure 700. For example, the fuzzy matching module 316 moves the query pointer ahead to the next character "e" in the input name, and, in one merely illustrative case, moves the tree pointer ahead to a hypothetical character "o" in the tree structure 700. Since "e" does not match "o," this is a mismatch-type transition.

The third scenario shown in FIG. 8 corresponds to an omission-type transition. In this case, the fuzzy matching module 316 moves the tree pointer ahead, but not the query pointer. The implication of this type of transition is that the input name may omit a character that is properly within the tree structure 700.

The fourth scenario shown in FIG. 8 corresponds to an insertion-type transition. In this case, the fuzzy matching module 316 moves the query pointer ahead, but not the tree pointer. The implication of this type of transition is that the input name may include an erroneous extra character that not found within the tree structure 700.

The fuzzy matching module 316 assigns confidence values to different types of transitions. A match-type transition has a relatively high confidence value. Other transitions have much lower confidence values. Different implementations can tune these confidence values to provide desirable results for particular environments. In one illustrative (and optional) case, the confidence values can be normalized such that the sum of all possible transitions is 1.0 or some other specified value.

Each search state also has a confidence value associated therewith. For example, in one merely illustrative case, the root node 702 can be defined, by default, to have a confidence value of 1.0. Or the root node 702 can be assigned an initial confidence value determined by a prior probability assessment operation (e.g., based on a probability assessment made by the input module 302 in the course of inputting name information via voice recognition functionality, OCR functionality, handwriting recognition functionality, and so on). Any other search state in the tree structure 700 has a confidence value that is computed by multiplying the confidence value of the initial search state by the transition-related confidence values that led to this search state. For example, consider the example of FIG. 9. Here the original search state is S1 having a confidence value of 1.0. The transition from search state S1 to search state S2 has a confidence value of 0.1, so the confidence value of search state S2 is 1.0.times.0.1=0.1. The terminal search state, referred to as the goal state (GS), has a confidence value that reflects the product of the confidence values that led to it. Namely the confidence value of the goal state is 1.0.times.0.1.times.0.1.times.1.0=0.01. The confidence value of a goal state corresponds to the fuzzy match score of a fuzzy match.

The fuzzy matching module 316 attempts to find a path, for a given input name, from the root node 702 to one of the goal states of the tree structure 700. The fuzzy matching module 316 may have many path options, each culminating in a goal state having a cumulative confidence value associated therewith. The fuzzy matching module 316 attempts to find the path that culminates in a goal state having the highest relative confidence value among available options. In other words, the goal state with the highest confidence value corresponds to the index name that is most similar to the input name. In practice, the fuzzy matching module 316 can determine a group of n paths having the highest confidence values, not simply the single highest path.

The fuzzy matching module 316 goes about the task of finding the best path or paths by tracing out different possible paths that can be taken through the tree structure 700. More specifically, for each search state in a path, the fuzzy matching module 316 has four transition options to choose from (corresponding to the four types of transitions described above). For each search state, the fuzzy matching module 316 explores all of these transitions. As can be appreciated, this leads to a large number of path permutations to be considered. The complete set of all possible states defines a search space. Different algorithms can be used to find the most promising paths through the search space. One such algorithm that can be used is the "best first search" algorithm.

Figure 10:
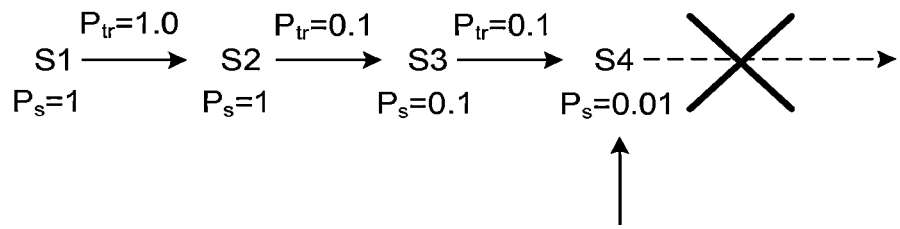
FIG. 10 is a graphical depiction that shows one illustrative way of aborting a search path when the confidence value of the search path exceeds a prescribed threshold.

The fuzzy matching module 316 can reduce the complexity of the fuzzy matching algorithms by adopting one or more rules. FIG. 10 shows the application of one such rule. This rule directs the fuzzy matching module 316 to abort a particular trial path if the confidence value of a search state within the path drops below a prescribed threshold. The "X" mark in FIG. 10 indicates that this particular trial path is abandoned because the confidence value of state S4 is 0.01, which, in this merely representative case, is below a prescribed threshold.

In another rule, the fuzzy matching module 316 can pre-compute the results that will be generated when the user enters the correct spelling of a name in the index, or when the user enters a name that converts to the correct phonetic representation of a name in the index, and so on. At query time, before performing the fuzzy matching operation, the fuzzy matching module 316 can determine whether an input name under consideration is identified in a list for which pre-computed results exist. If so, the fuzzy matching module 316 can retrieve the pre-computed results from this list, rather than repeating the fuzzy matching operation. The results may identify the fuzzy matches associated with the input name and the associated fuzzy match scores of these matches. The philosophy underlying this rule is that a large number of users can be expected to enter correct spellings (or correct phonetic representations) of names. The fuzzy matching module 316 pre-computes the results for these correct inputs so as to shorten computation time and reduce the load on the query module 116.

Figure 11:
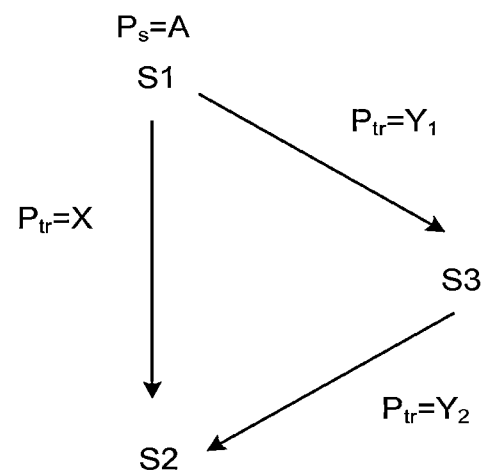
FIG. 11 is a graphical depiction that shows one illustrative way of determining a consolidated confidence value associated with multiple search paths that lead to a same search state.

FIG. 11 shows the application of another rule. This rule pertains to those instances in which two or more paths through the tree structure 700 lead to the same search state. These two paths may terminate in the same search state, but with different respective confidence values. The fuzzy matching module 316 addresses this discrepancy by computing a consolidated confidence value associated with the search state using the equation given above. Namely, if the confidence value of a first path is p.sub.1 and the confidence value of a second path is p.sub.2, then the consolidated confidence value, $p_{consolidated}$, is equal to $1-((1-p_1)\cdot(1-p_2))$.

E. Ranking Functionality (FIGS. 12-19)

Figure 12:
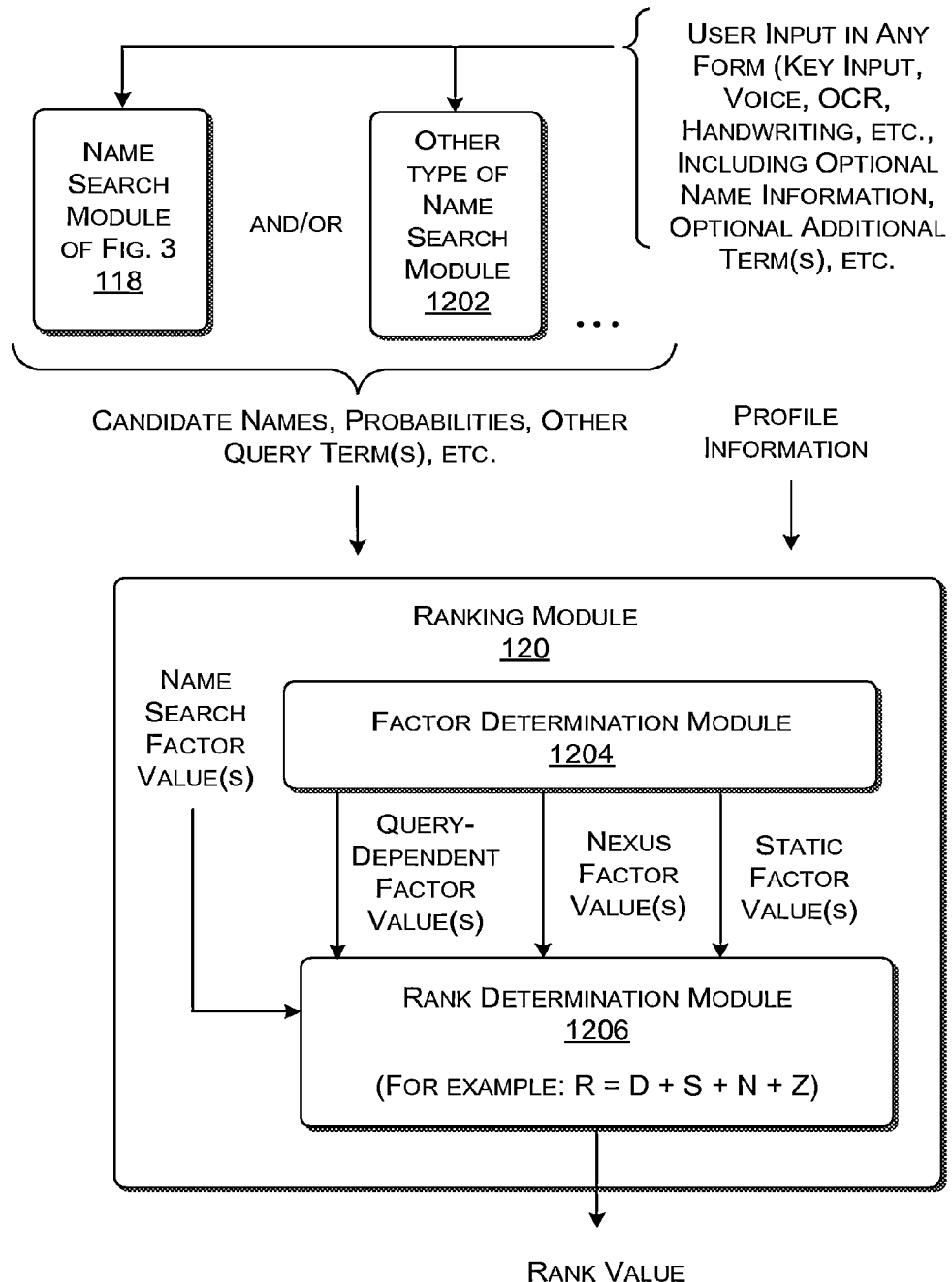
FIG. 12 shows an illustrative ranking module that can be used to rank candidate names; the ranking module is part of the query module of FIG. 3.

FIG. 12 shows a more detailed depiction of the ranking module 120 introduced in FIGS. 1 and 3. As mentioned, the ranking module 120 ranks a set of candidate names using a ranking function. The ranking function computes a rank value for each candidate name under consideration based on one or more factors.

Different approaches can be used to generate the set of candidate names that are fed to the ranking module 120. In one approach, the name search module 118 described in Section C can be used to identify the set of candidate names using, for instance, a fuzzy matching operation, a lookup operation, and a scoring operation. The output of the name search module 118 of Section C is the set of candidate names together with probability scores associated with the candidate names (as well as other optional information).

Alternatively, or in addition, other types of name search modules can be used to identify the candidate names (where FIG. 12 identifies any one or more of such modules as "other type of name search module" 1202). In one case, for example, voice recognition functionality can be used to receive a spoken input name. The user can enter the spoken name over the telephone (e.g., in the course of interacting with an automated directory assistance mechanism or the like). Or the user can enter the spoken input name via a local microphone, and so on. The voice recognition functionality can compare the spoken input name with the pronunciations of names in the index. Based on this comparison, the voice recognition functionality can identify one or more candidate names in the index which are considered potential phonetic matches of the input name. The voice recognition functionality can also identify probability scores associated with these matches. For each candidate name, the probability score reflects the degree of phonetic similarity between the input name and the candidate name in the index. More specifically, in one implementation, the voice recognition functionality operates with a matching accuracy within a predetermined range (e.g., 90%-98% in one merely illustrative case), depending on the quality of the input audio signal and/or other potential factors. Because there is some uncertainty in the matching accuracy, the voice recognition functionality may generate multiple candidate names with associated probabilities, rather than a single candidate name.

Another type of name search module can use handwriting recognition functionality to generate a list of candidate names. Handwriting recognition functionality can operate by comparing the characters in a handwritten name (as scanned in) with predetermined character information. Based on this analysis, the handwriting recognition functionality produces a set of names that potentially match the scanned in input name. The handwriting recognition functionality can assign a probability score to each potential name which reflects the degree of confidence it has that the potential name matches the scanned in input name (e.g., based on character shape-based analysis). The name search module 1202 can perform a lookup of each potential name to determine whether it exists in the index; if so, the name search module 1202 identifies the potential name as a candidate name having the probability score that is associated with the potential name. The handwriting recognition functionality may generate multiple candidate names, rather than a single candidate name, because there may be a range of uncertainty in its matching results (as described above for the case of voice recognition).

Another type of name search module can use optical character reader (OCR) functionality to generate a list of candidate names. The OCR functionality can operate by comparing characters in a printed name (as scanned in) with predetermined character information. Based on this analysis, the OCR functionality produces a set of names that potentially match the scanned in input name. The OCR functionality can assign a probability score to each potential name which reflects the degree of confidence it has that the potential name matches the scanned in input name (e.g., based on character shape-based analysis). The name search module can perform a lookup of each potential name to determine whether it exists in the index; if so, the name search module 1202 identifies the potential name as a candidate name having the probability score that is associated with the potential name. The OCR functionality may generate multiple candidate names, rather than a single candidate name, because there may be a range of uncertainty in its matching results (as described above for the case of voice recognition).

Still other types of names search modules can be used to generate a list of candidate names.

In one case, the ranking function used by the ranking module 120 is based, in part, on a name search factor. The name search factor represents the outcome of the analysis performed by a name search module (118 or 1202). For example, the value of this name search factor may represent the probability score assigned by any name search module that is used (e.g., 118 or 1202). In another case, the ranking function can be based on multiple name search factors. For example, another name search factor can identify whether there is a mismatch between the number (and/or order) of component names in an input name compared to a candidate name under consideration.

In another case, the ranking function can entirely omit name search factors. In this case, the name search module (118 or 1202) can generate a list of candidate names without also generating matching information (e.g., probability scores) for use as a name search factor.

In another case, the ranking module 120 can be used by itself without any name search module (118 or 1202). In this case, for instance, the user can enter any combination of query terms, with or without name information. The ranking module 120 can then identify relevant documents without the assistance of the similarity analysis provided by the name search module (118 or 1202). For example, the user may enter "test engineer, Seattle, Team A," (with or without an input name) to receive a list of one or more documents which are deemed appropriate in view of the entered query terms. In these cases, if the user supplies an input name, the name constitutes a query term like any other query term in the input information. The ranking module 120 can select potentially relevant documents corresponding to an entire index of names or some subset thereof (e.g., corresponding to the user's contact list, and/or an appropriate group contact list, and so on).

The ranking module 120 can include, or can be conceptualized to include, two components. A first component is a factor determination module 1204. The factor determination module 1204 computes the values of one or more factors used to compute a rank value for a particular candidate name under consideration. That is, as mentioned, the rank value can be based on other factors in addition to the optional name search factor. The factor determination module 1204 computes the values of such one or more other factors (to be discussed).

A second component used by the ranking module 120 is the rank determination module 1206. The rank determination module 1206 computes the rank value for each candidate name and then ranks the candidate names on the basis of their associated rank values. FIG. 5 shows one such illustrative ranking function that can be used to implement the rank determination module 1206. In this case, the rank value is based on a weighted linear combination of different factors, where the variables a, b, c, etc. represent the different factors. The ranking function can include any number of variables. Here, the variable a represents the name search factor. The rank determination module 1206 inputs the probability score of the candidate name (as computed by the name search module 118) into this variable. The factors $c_1$, $c_2$, $c_3$, etc. represent weights applied to respective factors within the ranking function. The rank determination module 1206 selects the values for these weights to produce desirable ranking results.

The rank determination module 1206 can implement the ranking function using any mechanism. In one case, the rank determination module 1206 uses a neural network to implement the ranking function. In this implementation, a learning mechanism can be used to dynamically adjust the weights in the ranking function based on the performance of the ranking module 120 (where the performance reflects the success of the ranking module 120 in producing useful results in response to the queries of users). The neural network can be implemented as a single-layer neural network (which is equivalent to a linear ranking function model) or a higher-order neural network.

FIG. 12 also shows that various inputs are fed into the ranking module 120. One input corresponds to the above-described candidate names and associated probability scores (and other optional matching information) provided by the name search module (118 or 1202). Another possible input corresponds to one or more query terms (besides the input name) that the user enters as input information (e.g., as in the case in which the user enters "test engineer" to indicate that the person being sought is a test engineer). Another possible input corresponds to profile information maintained in the source store 108 or elsewhere. The profile information may yield additional information regarding the user performing the search and/or the people associated with the candidate names (in the manner described below). The ranking module 120 may accept yet other inputs.

In one case, the ranking module 120 operates in the same manner for all users. In another case, the ranking module 120 can operate in a different way for different respective users. For example, the ranking module 102 can apply different factors (a, b, c, etc.) for different users, and/or different weights ($c_1$, $c_2$, $c_3$, et.) for different users, and so on. Further, as mentioned above, the list of candidate names that is considered by the ranking module 102 for a particular user can be restricted to those names that are identified in a user-specific contact list (e.g., the user's contact list or an appropriate group contact list, etc.).

In another case, the rank determination module 1206 can generate a rank value based on the function $R=D+S+N+Z$. Here, R refers to the rank value associated with a candidate name (or, more specifically, in one illustrative implementation, a profile document that contains the candidate name). D is an optionally-included dynamic rank score associated with one or more query-dependent factor values (associated with any query terms entered by the user, such as expertise information, team information, etc., as well as, in this case, the input name itself). N is an optionally-included nexus rank score associated with one or more nexus factor values. S is an optionally-included static rank score associated with one or more static factor values. These types of factor values were described previously and will also be described at greater length below. The rank value R can also be based on other types of optionally-included rank scores, generically denoted above as illustrative rank score Z. The phrase "optionally-included" in this description indicates that any one or more of the scores of the equation can omitted.

The dynamic rank score D can be generated using any type of appropriate function. For example, the dynamic rank score D can reflect a weighted combination of two or more query-dependent values (as described above). In another illustrative and non-limiting case, the dynamic ranking score D can be generated by applying a BM25-type algorithm, such as the general purpose BM25 algorithm or the BM25F algorithm, and so on.

The BM25F algorithm is described, for instance, in Nick Craswell et al., "Microsoft Cambridge at TREC-14: Enterprise Track," Proceedings of the Fourteenth Text Retrieval Conference (TREC 2005), Gaithersburg, Md., November 2005. As stated therein, one illustrative and non-limiting version of the BM25F algorithm operates by generating a normalized term frequency $x_{d,f,t}$ for each field type f of a document d for a particular query term t. The "field type" f refers to a part of the information associated with the document, such as the title of the document, the body of the document, and so on. In one case, $x_{d,f,t}$ can be computed as $x_{d,f,t}/(1+B_f((l_{d,f}/l_f)-1))$, where $x_{d,f,t}$ is the term frequency of the query term t in the field type f of the document d, $B_f$ is a field-dependent parameter, $l_{d,f}$ is the length of the particular field type f, and $l_f$ is the average field length for the field type f. The generated $x_{d,f,t}$ values can be combined in a linearly weighted sum to yield a final term pseudo-frequency: $x_{d,t}=\Sigma_f (W_f x_{d,f,t})$, where $W_f$ denotes weighting parameters. The computed $x_{d,t}$ can be used in the following ranking function: $BM25F(d):=\Sigma_{t \in q \cap d} (x_{d,t}/(K_1+x_{d,t})) w_t$, where $w_t$ is an RSJ relevance weight for term $_t$, and $K_1$ is a saturating parameter.

Similarly, each of the nexus rank score N and the static rank score S can be computed using any kind of function, such as a weighted linear combination or other type of function.

In a first illustrative case, at least one additional score (such as the Z rank score) in the ranking function is based on the above-described name search factor value (or values). One example of a name search factor value is a probability score associated with a candidate name. In a second illustrative case, the dynamic rank score D can depend on the name search factor value. For example, if a BM25-type algorithm is used, the probability score associated with a candidate name can be multiplied by the term frequency associated with the candidate name (where the candidate name here functions as one of the query terms). This will have the effect of offsetting the term frequency depending on the confidence level associated with the candidate name, as assessed by the name search module (118 or 1202). Other rank scores (e.g., N and S) can also depend on the name search factor value. In a third illustrative case, the ranking function may omit all dependence on the name search factor value. The above-described cases are not mutually exclusive. For example, the ranking function can include the Z rank score which is dependent on the name search factor value and also provide a dynamic rank score D which is dependent on the name search factor value.

Figure 13:
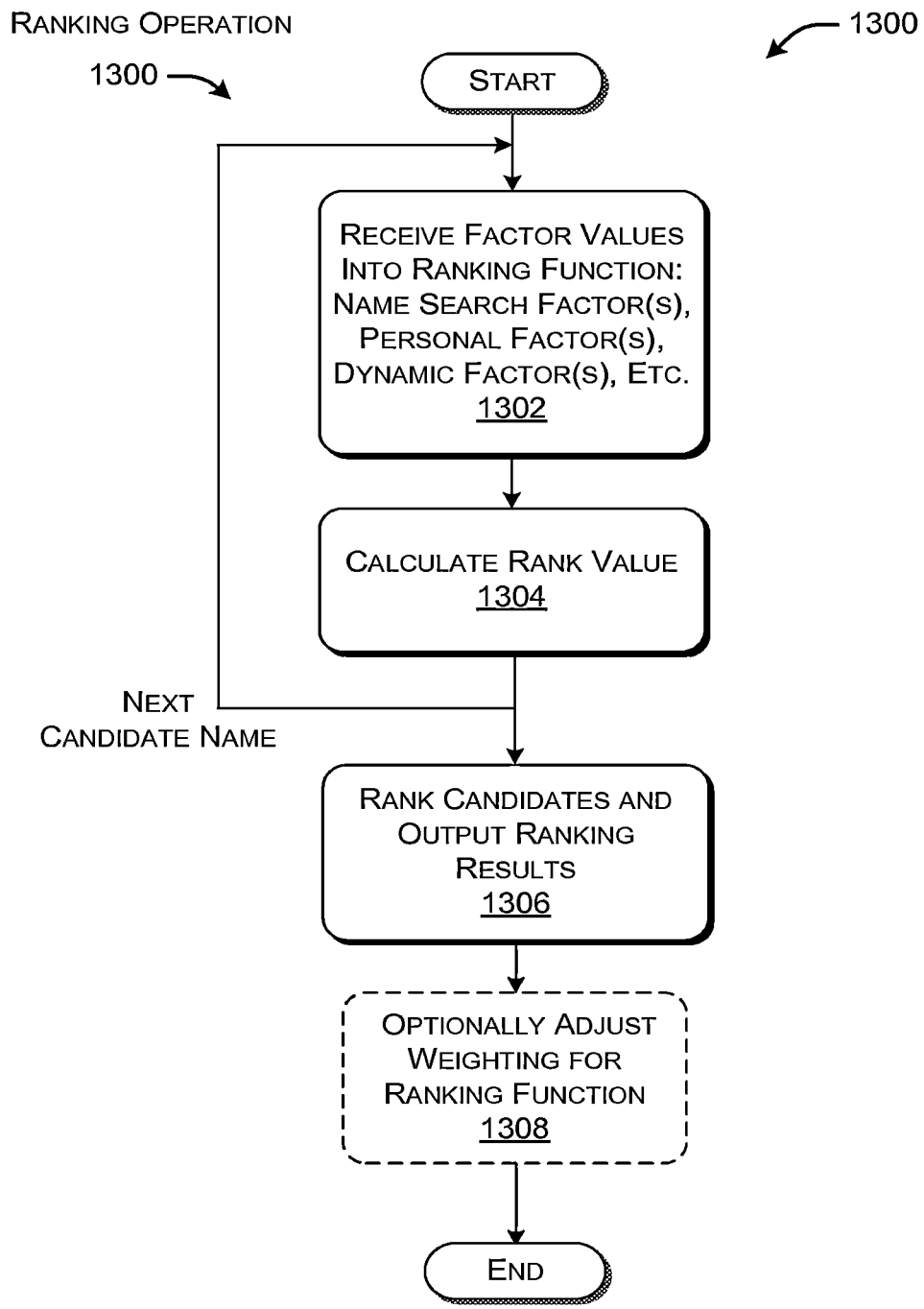
FIG. 13 shows an illustrative procedure for ranking candidate names using the ranking module of FIG. 12.

FIG. 13 shows an illustrative procedure 1300 for ranking candidate names using the rank determination module 1206 of FIG. 12. In block 1302, the rank determination module 1206 receives one or more factor values for use in computing a rank value for a particular candidate name under consideration. These factors values may include the probability score generated by the name search module (118 or 1202) (and/or other matching information). The factor values may also include one or more other factor values generated by the factor determination module 1204. These other factor values may reflect matching considerations unrelated to the similarity between the input name and the candidate name under consideration.

In block 1304, the rank determination module 1206 computes the rank value for the candidate name under consideration in the manner discussed above. The loop labeled "next candidate name" indicates that blocks 1302 and 1304 are repeated for all candidate names identified by the name search module (118 or 1202).

In block 1306, having computed rank values for all the name candidates, the rank determination module 1206 outputs a ranked list of candidate names, that is, in which the candidate names are ranked according to their associated rank values.

Block 1308 generally indicates that the performance of the ranking operation can be used to adjust the weights used by the rank determination module 1206 to compute the rank values. That is, this block (1308) can entail assessing the performance of the ranking module 1206 in ranking profile documents associated with the candidate names and then adjusting the weights of the ranking function based on the assessed performance.

Figure 14:
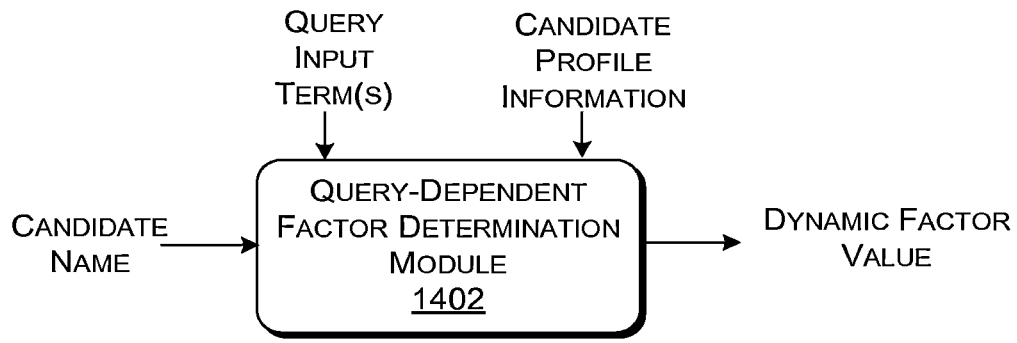
FIG. 14 shows an illustrative query-based factor determination module for determining a query-based factor value; the query-based factor is one optional factor that can be used to rank candidate names using the ranking module of FIG. 12.

FIG. 14 shows an illustrative query-based factor determination module 1402 for determining a query-based factor value. The query-based factor determination module 1402 is one possible part of the factor determination module 1204 of FIG. 12. The query-based factor value that is generated by this module 1402 is one optional value that can be used to rank candidate names using the ranking module of FIG. 12, as explained below.

The query-based factor determination module 1402 receives one or more query terms provided by the user in the input information (that is, in addition to the input name). The query-based factor determination module 1402 also examines the profile information of a candidate name under consideration. The query-based factor determination module 1402 operates by determining whether one or more query terms entered by the user match one or more items of information in the candidate's profile information. For example, assume that the user enters the input information "John Tanner, accountant." Assume further that the ranking module 120 is in the process of computing a rank value for a candidate name "Jon Taner," which is a valid name in the index. In this case, the query-based factor determination module 1402 determines whether the profile information of Jon Taner indicates that this person is an accountant. If he is, the query-based factor determination module 1402 can assign a first value to the factor value (e.g., 1). If he is not, the query-based factor determination module 1402 can assign a second value to the factor value (e.g., 0).

In the above example, the query-based factor corresponds to expertise information associated with a person. This is merely one example. Other query-based factors can be used which correspond to other attributes regarding a person, such as the person's contact information (addresses, telephone numbers, fax numbers, etc.), birthday, job responsibilities, supervisors, assistants, departments, group affiliations, hire dates, interests, prior projects, peers, family members, schools attended, skills, job titles, website information, geographic locations, social tags, and so on. No limitation is placed on the types of information on which a query-based factor can be based. In one case, the query-based determination module 1402 can assign different respective factors for different types of information. For example, a candidate's department affiliation may correspond to one factor in the ranking function, the candidate's college name may correspond to another factor in the ranking function, and so on. In another case, the query-based determination module 1402 can define a single score (such as the above-described dynamic rank score D) for input into the ranking function which, in turn, is based on some function of different types of user-input information. The BM25-type algorithms described above are one way to generate such a dynamic rank score. Or the query-based determination module 1402 can define two or more of such dynamic rank scores.

Figure 15:
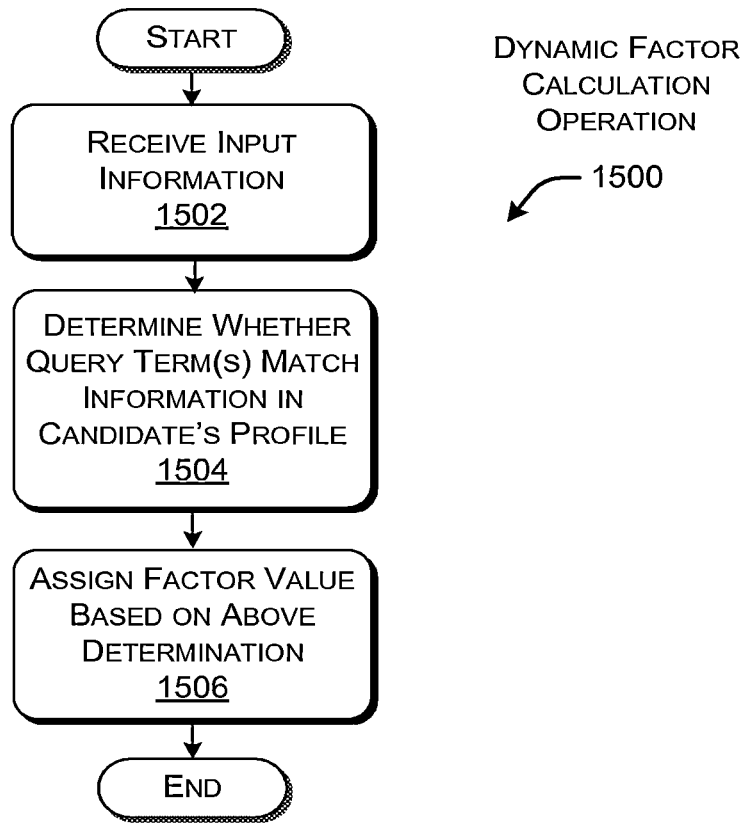
FIG. 15 shows an illustrative procedure for determining a query-based factor value using the query-based factor determination module of FIG. 14.

FIG. 15 shows an illustrative procedure 1500 for determining a query-based factor value using the query-based factor determination module 1402 of FIG. 14. In block 1502, the query-based factor determination module 1402 receives input information from the user, which may include an input name and one or more supplemental query terms. The query-based factor determination module 1402 also looks up the profile information of the candidate name under consideration.

In block 1504, the query-based factor determination module 1402 determines whether the input query term(s) match corresponding information item(s) in the candidate's profile information.

In block 1506, the query-based determination module 1402 assigns a factor value to the query-based factor based on the results of the determination made in block 1504. Or block 1506 can entail assigning plural values to plural respective query-based factors.

Figure 16:
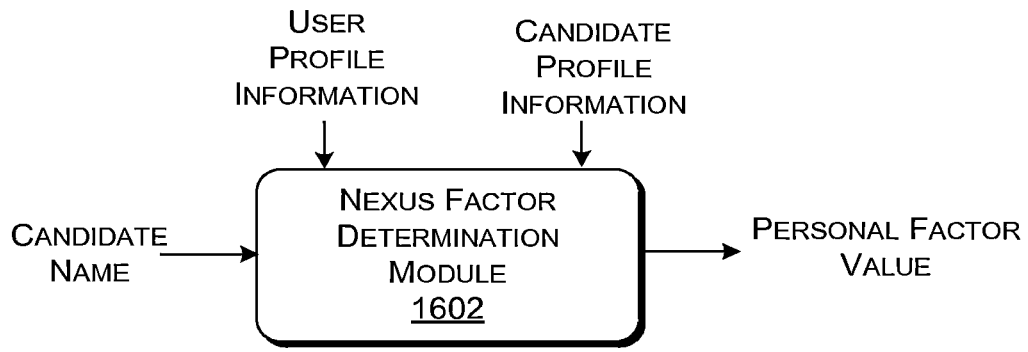
FIG. 16 shows an illustrative nexus factor determination module for determining a nexus factor value; the nexus factor is one optional factor that can be used to rank candidate names using the ranking module of FIG. 12.

FIG. 16 shows an illustrative nexus factor determination module 1602 for determining a nexus factor value. The nexus factor determination module 1602 is one possible part of the factor determination module 1204 of FIG. 12. The nexus factor value provided by this module 1602 is one optional value that can be used to rank candidate names using the ranking module of FIG. 12, as explained below The nexus factor determination module 1602 accepts profile information corresponding to a person performing a search (i.e., the user) as well as profile information corresponding to a candidate number under consideration. The nexus factor determination module 1602 operates by determining the extent of a nexus between the user and the person associated with the candidate name. The nexus factor determination module 1602 expresses the degree of such a relationship as a nexus factor value which is used in the ranking function.

In one case, the user interacts with the query module 116 using a standalone computing device or in a network environment. In these cases, the nexus factor determination module 1602 can determine the identity of the user in various ways. According to one way, the nexus factor determination module 1602 can determine the user's identity based on password information or other personal data that the user expressly enters. In another way, the nexus factor determination module 1602 can determine the user's identity by mapping the user's network address to the identity of the user, and so on. In another case, the user interacts with the query module 116 via a telephone system or the like. In this case, the nexus factor determination module 1602 can determine the user's identity by mapping the user's telephone number (or the like) with the identity of the user, and so on.

To provide one example of the operation of the nexus factor determination module 1602, the profile information of the user may indicate that her expertise is in the field of dermatology. The profile information of a candidate name under consideration may likewise indicate that this person works in the field of dermatology. The nexus factor determination module 1602 computes a nexus factor value which reflects this relationship, e.g., by providing a first value if such a relationship exists and a second value if the relationship is lacking. The factor here can be referred to as "personal" because it relates to the person performing the name search. The philosophy underlying this kind of determination is based on the assumption that people seek out like people. Thus, if the query module 116 is otherwise having a difficult time choosing between two candidate names, the person who works in the field of dermatology (in the above example) will be more favorably ranked over the person who is not.

The nexus factor can identify other types of relationships between the user and a candidate name under consideration. One nexus factor can identify whether the user and a candidate name share the same job title. Another nexus factor can identify whether the user and a candidate name are associated with a same building (e.g., because they may both work in that building). Another nexus factor can identify whether the user and a candidate name are associated with the same geographical region, such as a state, province, country, etc. (because they are both reside within that region, etc.). Another nexus factor can identify whether the user and a candidate name belong to a same group. Another nexus factor can identify whether the user and a candidate name publish and/or save documents on the same site or sites. Another nexus factor can identify whether the user and a candidate name are contributors to a same document, or, more generally, a same project, and so on.

Figure 17:
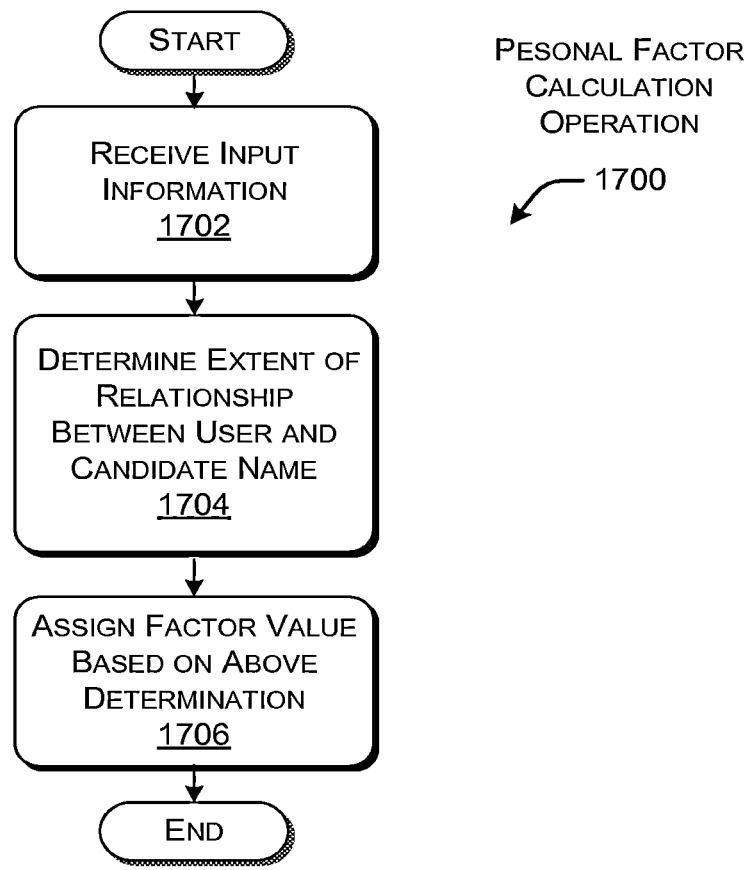
FIG. 17 shows an illustrative procedure for determining a nexus factor value using the nexus factor determination module of FIG. 16.

FIG. 17 shows an illustrative procedure 1700 for determining a nexus factor value using the nexus factor determination module 1602 of FIG. 16. In block 1702, the nexus factor determination module 1602 receives input information in the form of profile information. The profile information may include both information regarding the user performing the search and information regarding the candidate name under consideration.

In block 1704, the nexus factor determination module 1602 determines whether a prescribed nexus exists between the person performing the search and the person associated with the candidate name.

In block 1706, the nexus determination module 1602 assigns a factor value to the nexus factor based on the results of the determination made in block 1704.

Figure 18:
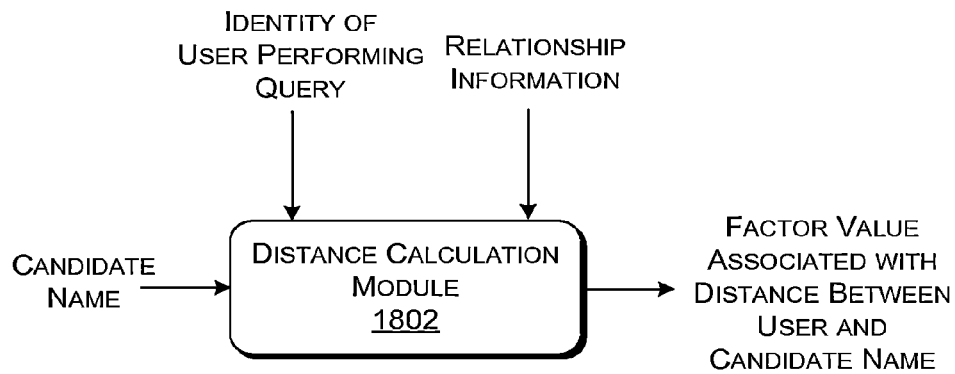
FIG. 18 shows an illustrative social distance determination module for determining a social distance value; the social distance is one example of a nexus factor that may be provided by the nexus factor determination module of FIG. 16.

A particular type of nexus factor determination module 1602 is a social distance calculation module 1802, as shown in FIG. 18. This module provides a factor value that reflects the degree of relationship between the person performing the search (i.e., the user) and the person associated with a candidate name under consideration. The social distance can also be viewed as the relational proximity of the user and the person associated with the candidate name under consideration. To make this determination, the social distance calculation module 1802 receives information regarding the identity of the user (so as to identify the profile information of the user). This information can be extracted in any manner specified above. The social distance determination module 1802 also receives relationship information. The relationship information identifies relationships among people. In one case, a person's profile information may provide relationship information by listing the people that the person knows (e.g., friends, and/or family members, and/or work colleagues, and/or team members, e.g., people who share a common manager, and/or Email correspondents, and/or instant messaging buddies, and so on). No limitation is placed on the types of relationships that may be identified by a person's profile information. Together, the relationship information in a collection of profiles defines a nexus of relationships.

Figure 19:
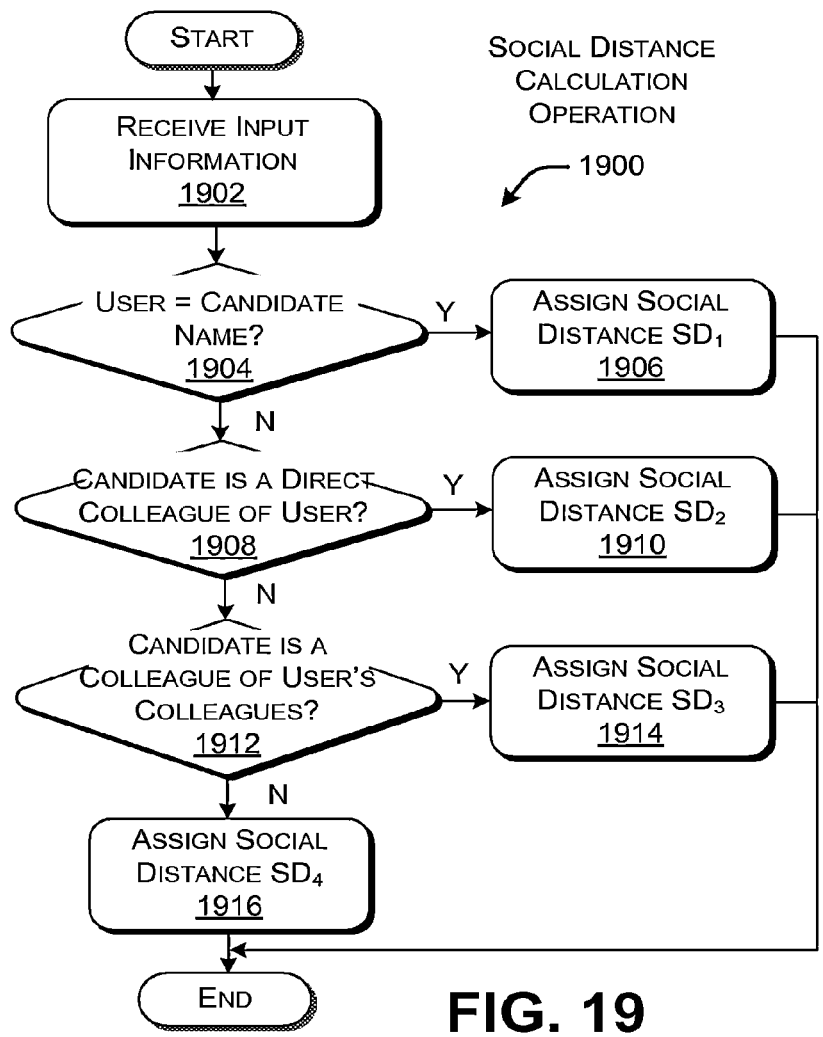
FIG. 19 shows an illustrative procedure for determining a social distance value using the social distance determination module of FIG. 18.

FIG. 19 shows an illustrative procedure 1900 for determining a social distance factor value using the social distance determination module 1802 of FIG. 18. This procedure 1900 is merely representative. There are other ways to compute social distance.

In block 1902, the social distance calculation module 1802 receives input information for use in performing the calculation. As stated above, such information includes profile information. The profile information, in turn, provides relationship information.

In block 1904, the social distance calculation module 1802 determines whether the user is actually the same person identified by the candidate name under consideration. If so, in block 1906, the social distance calculation module 1802 assigns a first value to the social distance factor.

In block 1908, the social distance calculation module 1802 determines whether the candidate name has a direct relationship with the user. This can be determined by ascertaining whether the candidate name under consideration is listed in the relationship information provided by the user's profile information. As stated above, the user and the candidate name may be potentially related in any way or combination of ways identified above—e.g., friends, work colleagues, Email correspondents, etc. If the condition in block 1908 is met, then the social distance calculation module 1910 assigns a second value to the social distance factor.

In block 1912, the social distance calculation module 1802 determines whether the candidate name has a "friend-of-friend" type relationship with the user. This can be determined by examining the profiles of the people that the user identifies as his friends (where "friends" is used here loosely to represent any type of relationship). If any of these profiles, in turn, identify the candidate name as a friend, the candidate name can be considered to have a "friend-offriend" type relationship with the user. If this condition is met, in block 1914, the social distance calculation module assigns a third value to the social distance factor.

In block 1916, presuming that none of the above conditions are satisfied, then the social distance calculation module 1802 assigns a fourth value to the social distance factor. The procedure 1900 of FIG. 19 describes four levels of social relation; but other implementations can provide additional levels or fewer levels.

Another nexus factor can be generated which is based on the geographical distance between a user and a candidate name under consideration. For example, the profile information associated with the user can identify that he works in Seattle, while the profile information associated with a candidate name can identify that this person works in Tacoma. A nexus factor value can be generated which is proportional to the physical distance between Seattle and Tacoma. This geographical factor value can be performed on a local scale by determining how close the user's building (e.g., at the user's place of work) is to the candidate name's building.

Another nexus factor can be based on the organizational distance between a user and a candidate name under consideration. For example, the profile information associated with the user can identify that he works in division X of company ABC, while the profile information associated with a candidate name can identify that this person works in division Y of company ABC. A nexus factor value can be generated which is based on the organizational relationship between divisions X and Y. For example, in one merely illustrative scenario, divisions X and Y are part of a larger unit working on a common project; in this case, the value of the nexus factor is selected to convey this sibling-type relationship. In one case, the "distance" between parts of an organization can be assessed by determining the relation of one part to another part within an organizational chart. For instance, the distance can be determined based on whether the parts have common parent node(s), common ancestor node(s), and so on. A similar type of distance score can be generated based on the difference between the user's position within a reporting hierarchy and the candidate name's position within the reporting hierarchy.

The ranking module 120 can use yet other types of factors besides the above-described name search factors, query-based factors, and nexus factors. For example, the rank function can also be based on one or more static factors. A static factor is a factor which is based on neither the user's query terms (in the input information) nor the identity of the user himself. The ranking module 120 can use a static factor determination module (not shown) to compute one or more of such static factor values.

In one implementation, the static factor determination module can receive profile information pertaining to a candidate name under consideration. The static factor determination module can then generate a static factor value based on a determination that the profile information includes a certain attribute (or attributes), or lacks a certain attribute (or attributes), and so on. For example, the static factor determination module can generate a static factor value that identifies whether or not a candidate name under consideration is an expert pertaining to a particular topic. In another example, the static factor determination module can generate a static factor value based on the position of the candidate name under consideration within an organizational chart. No constraint is placed on the kind of candidate-related characteristic that can be expressed by a static factor value.

In addition, or alternatively, the static factor determination module can receive other information that does not pertain to the characteristics of the person associated with the candidate name per se. The static factor determination module can then generate a static factor value based on this information. For example, the static factor determination module can generate a static factor value based on how many times the candidate name's profile document has been accessed within an identified time interval. In another example, the static factor determination module can generate a static factor value based on whether the candidate name's profile document is current, whether it is relatively complete, and so on. Again, no constraint is placed on the information that can be expressed by a static factor value.

F. Illustrative Data Processing Functionality (FIG. 20-22)

Figure 20:
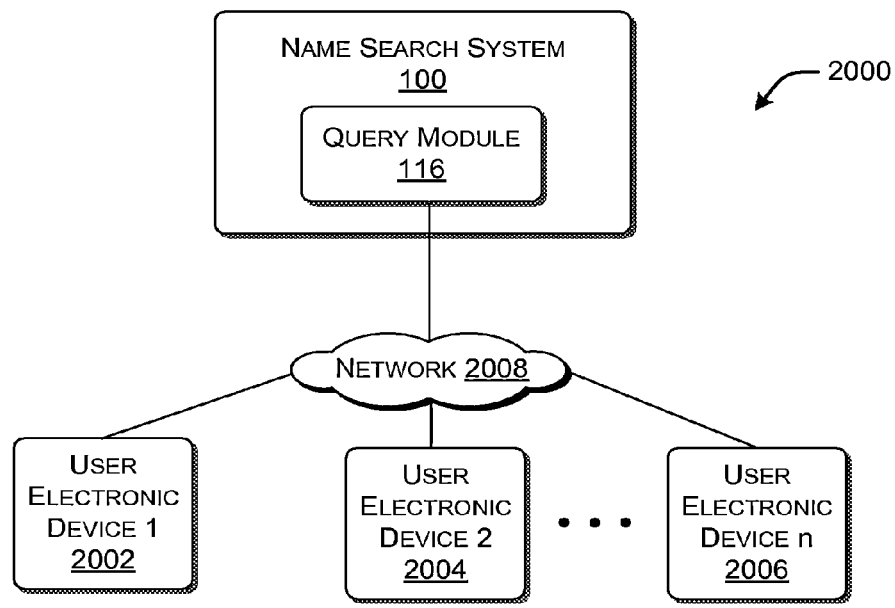
FIG. 20 shows an illustrative network environment for implementing the name search system of FIG. 1.
Figure 21:
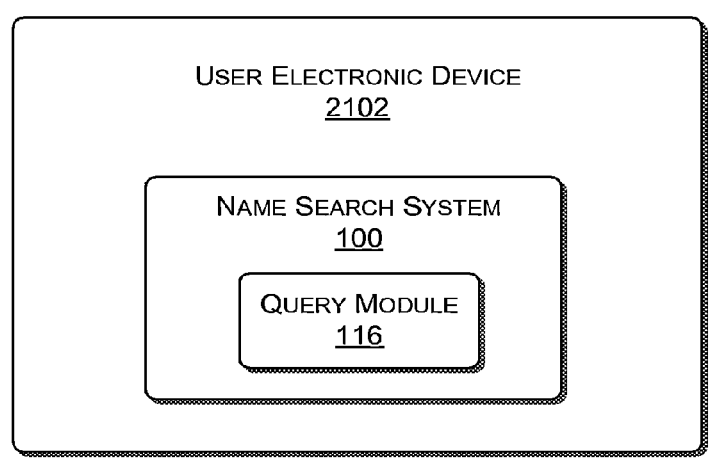
FIG. 21 shows an illustrative local environment for implementing the name search system of FIG. 1.

FIG. 20 shows an illustrative network environment 2000 for implementing the name search system 100 of FIG. 1. In the network environment 2000, users may access the query module 116 using respective user electronic devices (2002, 2004, . . . 2906) via a network 2008.

The user electronic devices (2002, 2004, . . . 2006) can correspond to any type of data processing device or any combination of types of data processing devices. For instance, a user electronic device can be implemented by a desktop computer, a laptop computer, a personal data assistant (PDA) device, a mobile communication device, a set-top box, a game console device, and so on. Users may access network-accessible resources using browsing functionality (not shown) provided by the user electronic devices (2002, 2004, . . . 2006).

The network 2008 may represent any type of mechanism for allowing the user electronic devices (2002, 2004, . . . 2006) to interact with the query module 116. The network 2008 can correspond to a wide area network (such as the Internet), a local area network (LAN), a point-to-point connection, or any combination of connectivity mechanisms. The network 2008 can be physically implemented using any combination of hardwired links, wireless links, name servers, gateways, routers, and so on (not shown). The network 2008 can be governed by any protocol or combination of protocols.

FIG. 21 illustrates a standalone environment 2100 for implementing the name search system 100. In this environment 2100, a user electronic device 2102 can locally implement the query module 116. The user electronic device 2102 can correspond to any type of device described above.

Still other implementations of the query module 116 are possible. For example, as discussed, the user can access the query module 116 via telephone or other communication device. In this example, the query module 116 can use voice recognition technology to receive input from the user and/or voice synthesizing technology to provide information to the user. In this example, the query module 116 can be implemented by electronic equipment (e.g., computer equipment) provided at a single site or plural distributed sites.

FIG. 22 sets forth illustrative electrical data processing functionality or equipment 2200 (simply "processing functionality" below) that can be used to implement any aspect of the functions described above. With reference to FIG. 1, for instance, the type of data processing equipment shown in FIG. 22 can be used to implement any aspect of the index-time functionality 102 and the query-time functionality 104. With reference to FIGS. 20 and 21, the type of data processing equipment shown in FIG. 22 can be used to implement any of the user electronic devices (2002, 2004, . . . 2006) and 2102. The processing functionality 2200 may correspond to a general purpose computing device, a special purpose computing device, or any other implementation.

The processing functionality 2200 can include volatile and non-volatile memory, such as RAM 2202 and ROM 2204, as well as one or more processing devices 2206. The processing functionality 2200 also optionally includes various media devices 2208, such as a hard disk module, an optical disk module, and so forth. The processing functionality 2200 can perform various operations identified above when the processing device(s) 2206 executes instructions that are maintained by memory (e.g., RAM 2202, ROM 2204, or elsewhere). More generally, instructions and other information can be stored on any computer-readable medium 2210, including, but not limited to, static memory storage devices, magnetic storage devices, optical storage devices, and so on. The term "computer-readable medium" also encompasses plural storage devices. The term "computer-readable medium" also encompasses signals transmitted from a first location to a second location, e.g., via wire, cable, wireless transmission, etc. The term "logic" describes instructions for performing identified tasks; for example, query logic corresponds to instructions associated with the tasks performed by the query module 116 as described above.

The processing functionality 2200 also includes an input/output module 2212 for receiving various inputs from a user (via input modules 2214), and for providing various outputs to the user (via output modules). One input module 2214 is a key input module. Another input module 2214 is a voice recognition input module. Another input module 2214 is an OCR module. Another input module 2214 is a handwriting recognition module, and so on. One particular output mechanism may include a presentation module 2216 and an associated graphical user interface (GUI) 2218. The processing functionality 2200 can also include one or more network interfaces 2220 for exchanging data with other devices via one or more communication conduits 2222. One or more communication buses 2224 communicatively couple the above-described components together.

In closing, the description may have described various concepts in the context of illustrative challenges or problems. This manner of explication does not constitute an admission that others have appreciated and/or articulated the challenges or problems in the manner specified herein.

More generally, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-readable medium for storing computer-readable instructions, the computer-readable instructions providing a ranking module when executed by one or more processing devices, the computer-readable instructions comprising:
   logic configured to receive a plurality of identified candidate names from a matching operation between an input name from a query and an index of names of people;
   logic configured to generate rank values associated with the respective candidate names using a ranking function, each rank value R for a candidate name being generated based on at least a result D+S+N, where D is a dynamic rank score associated with one or more query-dependent factor values, wherein each query-dependent factor value is associated with input information input by a user, N is a nexus rank score associated with one or more nexus factor values, wherein each nexus factor value is associated with an extent of a nexus between the user who inputs the input information and a person associated with the candidate name, and S is a static rank score associated with one or more static factor values, wherein each static factor value is associated with a determination regarding the candidate name that is independent of an identity of the user who inputs the input information;
   logic configured to rank the candidate names based on the rank values; and
   logic configured to output the candidate names on a display device as an ordered list according to the rank values.

2. The computer readable medium of claim 1, wherein the dynamic rank score D is calculated using a BM25-type ranking algorithm.

3. The computer readable medium of claim 1, wherein the computer-readable instructions further comprising:
   logic configured to, for each component name, identify at least one version of the component name and perform said determining and executing with respect to said at least one identified version of the component name.

4. The computer readable medium of claim 1, wherein at least two versions of a component name map to a same candidate name with respective probability scores associated therewith, further comprising producing a consolidated probability score associated with the same candidate name based on the respective probability scores.

5. The computer readable medium of claim 1, wherein the computer-readable instructions further comprising: logic configured to form an intersection to identify one or more candidate names that match lookup results associated with plural component names in the input name.

6. The computer readable medium of claim 5, wherein the computer-readable instructions further comprising: logic configured to determine the probability score of each candidate name by taking a product of fuzzy match scores associated with the component names that correspond to the candidate name.

7. A method for performing a search, the method being performed on electronic data processing equipment, the method comprising:
   receiving a plurality of identified candidate names from a matching operation between an input name from a query and an index of names of people;
   generating rank values associated with the respective candidate names using a ranking function, each rank value R for a candidate name being generated based on at least a result D+S+N, where D is a dynamic rank score associated with one or more query-dependent factor values, wherein each query-dependent factor value is associated with input information input by a user, N is a nexus rank score associated with one or more nexus factor values, wherein each nexus factor value is associated with an extent of a nexus between the user who inputs the input information and a person associated with the candidate name, and S is a static rank score associated with one or more static factor values, wherein each static factor value is associated with a determination regarding the candidate name that is independent of an identity of the user who inputs the input information;
   displaying on a display device the candidate names based on the rank values.

8. The method of claim 7, wherein the dynamic rank score D is calculated using a BM25-type ranking algorithm.

9. The method of claim 7 further comprising:
receiving input information that includes the input name;
parsing the input name into component names;
for each component name: determining at least one fuzzy match associated with the component name if there is at least one fuzzy match and executing a lookup operation in an index for each fuzzy match to provide at least one lookup result;
providing at least one candidate name based on a scoring analysis of lookup results provided for the component names in the input name, each candidate name having a probability score associated therewith which reflects a level of confidence that the candidate name is an appropriate match for the input name; and
generating a rank value associated with said at least one candidate name using a ranking function.

10. The method of claim 9, further comprising, for each component name: identifying at least one version of the component name; and performing said determining and executing with respect to said at least one identified version of the component name.

11. The method of claim 10, wherein said at least one version of the component name is a pronunciation version of the component name.

12. The method of claim 10, wherein at least two versions of a component name map to a same candidate name with respective probability scores associated therewith, further comprising producing a consolidated probability score associated with the same candidate name based on the respective probability scores.

13. The method of claim 10, wherein said providing of said at least one candidate name comprises forming an intersection to identify one or more candidate names that match lookup results associated with plural component names in the input name, further comprising determining the probability score of each candidate name by taking a product of fuzzy match scores associated with the component names that correspond to the candidate name.

14. A query module for performing a name search, comprising:
a name search module operative to receive a plurality of identified candidate names from a matching operation between an input name from a query and an index of names of people;
a ranking module operative to generate rank values associated with the respective candidate names using a ranking function, each rank value R for a candidate name being generated based on at least a result D+S+N, where D is a dynamic rank score associated with one or more query-dependent factor values, wherein each query-dependent factor value is associated with input information input by a user, N is a nexus rank score associated with one or more nexus factor values, wherein each nexus factor value is associated with an extent of a nexus between the user who inputs the input information and a person associated with the candidate name, and S is a static rank score associated with one or more static factor values, wherein each static factor value is associated with a determination regarding the candidate name that is independent of an identity of the user who inputs the input information, and rank the candidate names based on the rank values; and
an output module operative to display on a display device a subset of the ranked candidate names that satisfy a prescribed threshold of appropriateness.

15. The query module of claim 14, wherein the static rank score S is determined at least in part from information that does not pertain to the person who is associated with the candidate name.

16. The query module of claim 14, wherein the static rank score S is determined from profile information pertaining to the person associated with the candidate name.

17. The query module of claim 14, wherein the name search module is further configured to:
receive input information that includes the input name;
parse the input name into component names;
for each component name: determine at least one fuzzy match associated with the component name if there is at least one fuzzy match and execute a lookup operation in an index for each fuzzy match to provide at least one lookup result; and
provide at least one candidate name based on a scoring analysis of lookup results provided for the component names in the input name, each candidate name having a probability score associated therewith which reflects a level of confidence that the candidate name is an appropriate match for the input name.

18. The query module of claim 17, wherein the name search module is further configured to: for each component name, identify at least one version of the component name and perform said determining and executing with respect to said at least one identified version of the component name.

19. The query module of claim 18, wherein said at least one version of the component name is a pronunciation version of the component name.

20. The query module of claim 18, wherein the name search module is further configured to provide of said at least one candidate name by forming an intersection to identify one or more candidate names that match lookup results associated with plural component names in the input name, including determining the probability score of each candidate name by taking a product of fuzzy match scores associated with the component names that correspond to the candidate name.

* * * * *